(12) United States Patent
Thiemt et al.

(10) Patent No.: US 11,555,924 B2
(45) Date of Patent: Jan. 17, 2023

(54) LASER DISTANCE MEASURING DEVICE

(71) Applicant: Robert Bosch GmbH, Stuttgart (DE)

(72) Inventors: Stephan Thiemt, Winnenden (DE); Hendrik Hesse, Steinenbronn (DE); Volkan Akbiyik, Filderstadt (DE); Markus Lassmann, Ludwigsburg (DE); Lena Popiolek, Delmenhorst (DE); Joerg Stierle, Waldenbuch (DE); Corinna Sorg, Stuttgart (DE); Felix Gärtner, Schwäbisch Gmünd (DE)

(73) Assignee: Robert Bosch GmbH, Stuttgart (DE)

( * ) Notice: Subject to any disclaimer, the term of this patent is extended or adjusted under 35 U.S.C. 154(b) by 640 days.

(21) Appl. No.: 16/489,869

(22) PCT Filed: Oct. 5, 2017

(86) PCT No.: PCT/EP2017/075358
§ 371 (c)(1),
(2) Date: Aug. 29, 2019

(87) PCT Pub. No.: WO2018/177570
PCT Pub. Date: Oct. 4, 2018

(65) Prior Publication Data
US 2020/0011993 A1    Jan. 9, 2020

(30) Foreign Application Priority Data
Mar. 28, 2017 (DE) .................. 10 2017 205 195.7

(51) Int. Cl.
*G01S 17/08* (2006.01)
*G01S 17/86* (2020.01)
*G01S 7/481* (2006.01)

(52) U.S. Cl.
CPC ............ *G01S 17/08* (2013.01); *G01S 7/4813* (2013.01); *G01S 17/86* (2020.01)

(58) Field of Classification Search
CPC ...... G01S 7/4813; G01S 17/08; G01S 7/4817; G01S 7/4814; G01S 17/42; G01S 17/88;
(Continued)

(56) References Cited

U.S. PATENT DOCUMENTS

| 2006/0023059 A1* | 2/2006 | Towner ..................... H04N 1/19 347/234 |
| 2008/0192227 A1* | 8/2008 | Skultety-Betz ......... G01S 7/497 356/4.01 |

(Continued)

FOREIGN PATENT DOCUMENTS

| DE | 296 15 514 U1 | 1/1997 |
| DE | 10 2004 023 998 A1 | 12/2005 |

(Continued)

OTHER PUBLICATIONS

International Search Report corresponding to PCT Application No. PCT/EP2017/075358, dated Jan. 15, 2018 (German and English language document) (7 pages).

*Primary Examiner* — Mouloucoulaye Inoussa
(74) *Attorney, Agent, or Firm* — Maginot, Moore & Beck LLP

(57) ABSTRACT

A handheld laser distance measuring device for a contactless distance measurement between the laser distance measuring device and a remote object uses a laser beam that is emitted by the laser distance measuring device. The laser distance measuring device includes a device-side coupling device paired with the device housing. The coupling device is configured for reversibly arranging at least one attachment device on the laser distance measuring device. By arranging the at least one attachment device on the laser distance measuring device, at least one additional functionality can be provided.

16 Claims, 20 Drawing Sheets

Figure 1:
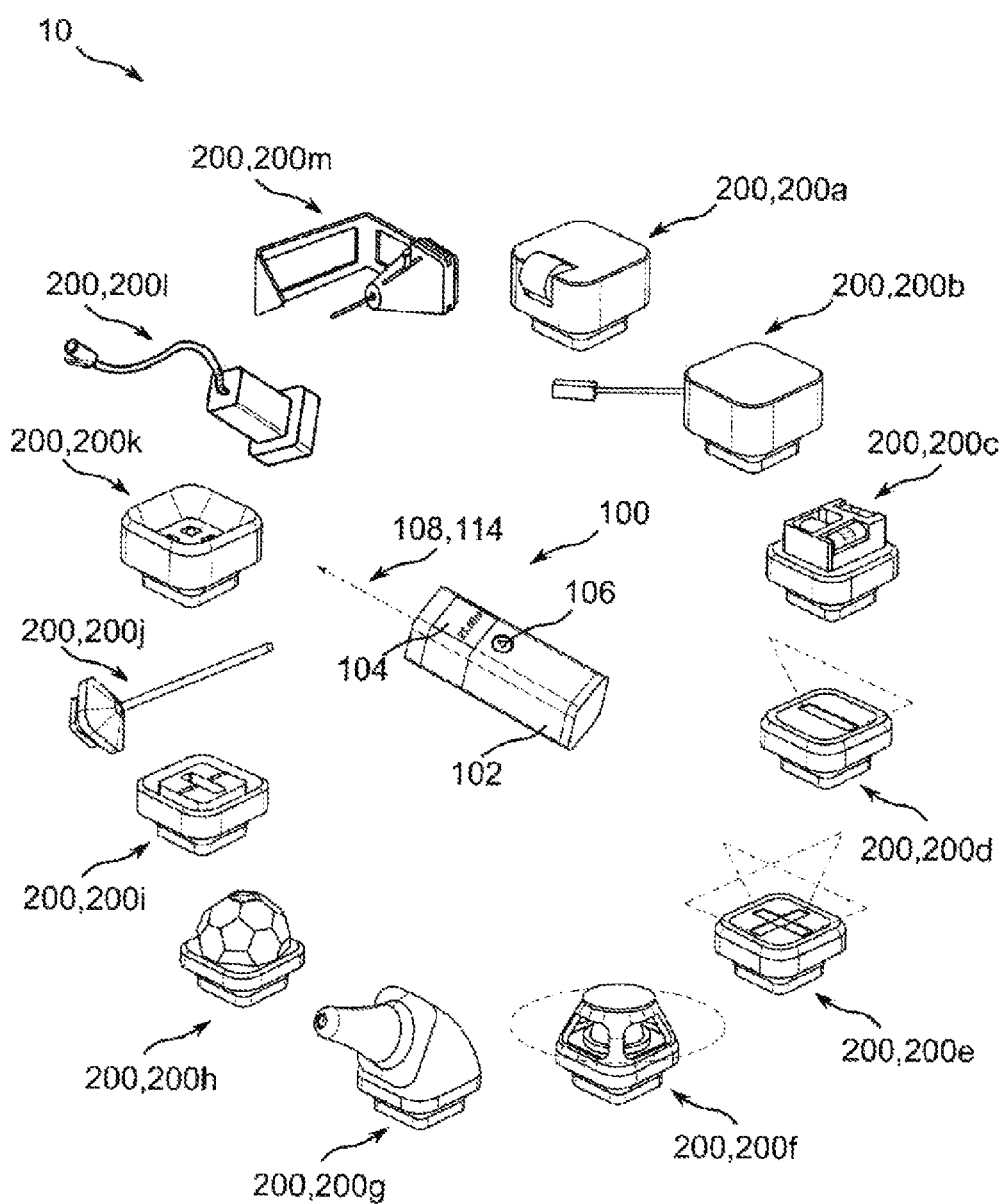

(58) Field of Classification Search
CPC ........ G01S 17/36; G01S 17/86; G01S 7/4808;
G01B 11/25; G01B 11/02; G01B
11/0608; G02B 7/09; G02B 27/646;
G02B 7/10; G02B 27/0081; G02B 7/40;
G03B 13/16; G03B 5/00; G03B 13/20;
H04N 5/232121; H04N 5/23218; H04N
5/23299; H04N 5/23216; H04N
5/232127; A61B 5/1072; A61B 5/1071;
A61B 5/1079; A61B 5/6814; G01C 5/00;
G01C 3/00; A01K 29/00; G01P 15/18;
G12B 5/00
USPC .............. 356/4.01; 359/811, 19; 361/679.01;
702/97, 159
See application file for complete search history.

(56) References Cited

U.S. PATENT DOCUMENTS

| | | | | |
|---|---|---|---|---|
| 2010/0235128 | A1* | 9/2010 | Wolf | G01C 3/08 |
| | | | | 702/159 |
| 2012/0069457 | A1* | 3/2012 | Wolf | G01S 7/4813 |
| | | | | 359/811 |
| 2012/0081848 | A1* | 4/2012 | Wolf | G01S 7/51 |
| | | | | 361/679.01 |
| 2014/0104591 | A1* | 4/2014 | Frischman | G01S 7/51 |
| | | | | 359/19 |
| 2014/0238100 | A1 | 8/2014 | Londergan et al. | |
| 2014/0324270 | A1* | 10/2014 | Chan | G01S 17/931 |
| | | | | 701/28 |
| 2015/0042977 | A1* | 2/2015 | Siercks | G01S 7/4817 |
| | | | | 356/4.01 |
| 2015/0185327 | A1* | 7/2015 | Boeckem | G01C 15/04 |
| | | | | 356/4.01 |
| 2016/0069678 | A1* | 3/2016 | Grace | A61B 5/1072 |
| | | | | 356/3.01 |
| 2016/0248969 | A1* | 8/2016 | Hurd | H04N 5/23218 |
| 2018/0003493 | A1* | 1/2018 | Bernhard | G01C 5/00 |
| 2018/0113200 | A1* | 4/2018 | Steinberg | G01S 17/42 |
| 2019/0154439 | A1* | 5/2019 | Binder | G01B 11/26 |
| 2019/0187282 | A1* | 6/2019 | Muschaweck | G01S 7/4817 |
| 2019/0227351 | A1* | 7/2019 | Behroozpour | G01S 7/4815 |

FOREIGN PATENT DOCUMENTS

| | | |
|---|---|---|
| DE | 10 2009 027 668 A1 | 1/2011 |
| DE | 20 2010 013 902 U1 | 1/2011 |
| EP | 2 169 347 A2 | 3/2010 |
| EP | 2 698 600 A1 | 2/2014 |
| GB | 2 167 262 A | 5/1986 |
| WO | 2012/089420 A1 | 7/2012 |

* cited by examiner

LASER DISTANCE MEASURING DEVICE

The invention relates to a handheld laser distance measuring device for the contactless distance measurement, an attachment device for the reversible arrangement on the laser distance measuring device as well as a system consisting of at least one handheld laser distance measuring device and at least one attachment device.

PRIOR ART

Handheld laser distance measuring devices are already known, for example from DE 10 2004 023 998 A1.

DISCLOSURE OF THE INVENTION

The invention is based on a handheld laser distance measuring device for the contactless distance measurement between the laser distance measuring device and a remote object using a laser beam which can be emitted by the laser distance measuring device, with a device housing and an energy supply device.

According to the invention, the laser distance measuring device has a device-side coupling device paired with the device housing, said coupling device being set up to reversibly arrange at least one attachment device on the laser distance measuring device, wherein at least one additional functionality can be provided due to the arrangement of the attachment device on the laser distance measuring device.

"Handheld" means that the laser distance measuring device can be at least guided by a hand of the operator during a measurement procedure, preferably carried, more preferably being held. For this purpose, the total mass of the laser distance measuring device is, in particular, less than 1 kg, preferably less than 500 g, particularly preferably less than 300 g. Furthermore, in one embodiment of the laser distance measuring device, all components of the laser distance measuring device can be accommodated in a device housing that essentially encloses the components. In particular, the length of the longest side of this device housing is less than 30 cm, favorably less than 20 cm, particularly favorably less than 15 cm. In an application example, the handheld laser distance measuring device can be used, for example, for measuring objects or interiors during manual activities.

For distance measurement, the handheld laser distance measuring device comprises an emitter device for emitting laser radiation or a laser beam, receiving optics for receiving laser radiation returning from a remote object, as well as at least one detector device for detecting received laser radiation as well as a control device.

The emitter device of the laser distance measuring device for emitting laser radiation has at least one light source, preferably in the form of a laser, a semiconductor laser or a laser diode, which, in particular, emits temporally modulated light, preferably laser radiation, in the direction of a remote object. In one embodiment, the laser radiation can be within a spectral wavelength range that is visible to the human eye, meaning, in particular, between 380 nm to 780 nm. Favorably, an operator of the laser distance measuring device can detect the laser radiation emitted by the laser distance measuring device without the aid of optical aids and, in particular, can perceive its projection onto the remote object as a projected laser marking.

A laser beam that is scattered and/or reflected from the target object illuminated by means of the emitted laser beam (i.e. returning from the target object) is projected onto the detector device, in particular, its detector element using receiving optics, preferably being imaged. For example, the receiving optics can comprise beam-forming and/or beam-steering optical elements and/or optical elements affecting the characteristics of the laser radiation, for example, lenses, filters, diffractive elements, mirrors, reflectors, optically transparent disks or the like. The returning laser beam is detected by means of the detector device at least partially and used to determine the distance to be measured. In this way, the detector device should be understood to be at least a radiation-sensitive detector element such as for example a photodiode, a PIN diode, an avalanche photo diode (APD), a single-photon avalanche diode (SPAD) or the like, which detector element provides a detection signal depending on an impacting light intensity.

The control device is used to control the laser distance measuring device and comprises an information input system, an information processing system as well as an information output system. In one embodiment, the control device can comprise a processor as well as operating programs stored in a memory of the control device and/or control routines and/or evaluation routines and/or calculation routines. The control device is intended to determine a distance from a distance measurement by means of the laser distance measuring unit. In particular, the control device may be intended to determine a light-travel time from a phase comparison carried out between the emitted laser radiation and the laser radiation returning from the surface of the target object and to calculate or to determine the sought-after spacing between the laser distance measuring device and the target object by way of the light speed. The control device is connected on a signal-engineering level with the other components of the laser distance measuring device, in particular the emitter device, the detector device, an output device, furthermore, for example, an input device, an energy supply device as well as a data communication interface. The control device is intended to communicate with these components during the operation of the laser distance measuring device and thus to enable an operation of the laser distance measuring device.

A determined distance measurement value in the direction of the emitted laser beam and/or a result of a calculation can be further processed by the control device of the laser distance measuring device and/or be output to an operator of the laser distance measuring device by means of an output device of the laser distance measuring device, for example, using a screen, in particular, a touch-sensitive screen, or an acoustic output device.

In one embodiment of the handheld laser distance measuring device, the control device is furthermore provided for receiving and/or evaluating of at least one piece of information provided by an attachment device arranged on the laser distance measuring device. Such information can be, in particular, a type of the arranged attachment device, an arranged state, a piece of data information determined by means of the arranged attachment device, in particular a measured value, or the like.

In particular, "provided" should be understood to mean specially programmed, designed and/or equipped. By the fact that an object is provided for a certain function, it should, in particular, be understood that the object fulfills and/or carries out this certain function in at least one state of application and/or operating state.

The laser distance measuring device comprises an energy supply device, for example, a battery or an accumulator, for its energy supply. Furthermore, the laser distance measuring device can have operator control elements for its operation.

Furthermore, an attachment device for arrangement on a handheld laser distance measuring device, in particular, a previously described handheld laser distance measuring device, is proposed comprising an attachment housing. The attachment housing is to be understood, in particular, as a housing which encloses all or at least all of the crucial components of the attachment device, for example, electronic or optical components, and/or which forms a crucial component part of the attachment device. According to the invention, the attachment device comprises an attachment-side coupling device paired with the attachment housing, said coupling device being set up to reversibly arrange the attachment device at least on the laser distance measuring device, wherein at least one additional functionality can be provided due to the arrangement of the attachment device on the laser distance measuring device.

The device-side coupling device of the laser distance measuring device and the attachment-side coupling device of the attachment device are designed in such a way, in particular in a corresponding or complementary way, that they favorably interact for the reversible, in particular functional and/or mechanical, arrangement of the attachment device on the laser distance measuring device. The coupling devices cause herein a detachable, in particular detachable in a tool-free manner, i.e. reversible, electrical and/or mechanical and/or signal-engineering connection of the attachment device to the laser distance measuring device. "Detachably connect or reversibly arrange" is herein in particular to be understood as meaning that an arrangement of a respective attachment device takes place in such a way that the attachment device can be separated and thereby removed from the device housing again, in particular from the laser distance measuring device, without destroying the laser distance measuring device and/or without destroying the device-side coupling device and the attachment-side coupling device. For example, such a reversibly detachable arrangement can occur by means of plugging on, plugging in, pushing on, docking, affixing, hooking or any other arrangement that is common to a person skilled in the art.

In one embodiment of the handheld laser distance measuring device, the device-side coupling device comprises a device-side coupling interface to form a mechanical connection of the attachment device to the device housing of the laser distance measuring device and/or a device-side energy interface to form an energetic connection of the attachment device to the laser distance measuring device, in particular to a control device and/or to an energy supply device of the laser distance measuring device, and/or a device-side data communication interface to form an information-transmitting connection of the attachment device to the laser distance measuring device, in particular to a control device and/or to an output device of the laser distance measuring device.

Correspondingly, in one embodiment of the attachment device, the attachment-side coupling device comprises an attachment-side coupling interface to form a mechanical connection of the attachment device to a device housing of the laser distance measuring device and/or an attachment-side energy interface to form an energetic connection of the attachment device to the laser distance measuring device, in particular to a control device and/or to an energy supply device of the laser distance measuring device, and/or an attachment-side data communication interface to form an information-transmitting connection of the attachment device to the laser distance measuring device, in particular to a control device and/or to an output device of the laser distance measuring device.

It should be noted at this point that in the following the device-side and/or the attachment-side half of the corresponding interface or the entire interface respectively is meant by "coupling interface(s)", "energy interface(s)" and "data communication interface(s)".

A (device-side/attachment-side) "coupling interface to form a mechanical connection" is in particular to be understood to be a (device-side/attachment-side) mechanical interface, which is designed to effect a mechanical connection of the attachment device to the device housing of the laser distance measuring device (or, in the context of this specification, synonymous with: "to the laser distance measuring device"). In particular, the mechanical interface causes fixation of the attachment device to the device housing of the laser distance measuring device.

In one embodiment, an attachment device can be arrangeable on the device housing of the laser distance measuring device using at least one magnet. By using the at least one magnet for arranging the attachment device on the device housing, a particularly simple arrangement or removal of the attachment device can be carried out by an operator of the laser distance measuring device.

In one embodiment of the handheld laser distance measuring device, the device-side coupling interface comprises at least one coupling element which is set up to implement a non-positive-locking and/or a positive-locking coupling with an attachment-side coupling interface of the attachment device. As as alternative or in addition, in one embodiment of the attachment device, the attachment-side coupling interface comprises at least one coupling element which is set up to implement a non-positive-locking and/or a positive-locking coupling with the device-side coupling interface of the laser distance measuring device.

By means of the at least one coupling element (regardless of whether it is a coupling element of the device-side coupling interface or of the attachment-side coupling interface), the attachment housing of the attachment device can be connected detachably, in particular detachably in a tool-free manner, mechanically to the device housing of the laser distance measuring device.

In one embodiment of the handheld laser distance measuring device, the device-side coupling interface comprises at least one coupling element which is set up to implement an axial lock and/or a radial lock and/or a spin-lock of the coupling with an attachment-side coupling interface of the attachment device. As as alternative or in addition, in one embodiment of the attachment device, the attachment-side coupling interface comprises at least one coupling element which is set up to implement an axial lock and/or a radial lock and/or a spin-lock of the coupling with a device-side coupling interface of the laser distance measuring device.

The directional indications such as "axial" and "radial", as well as the relative indication "rotation" thereby, in particular, refer to a reference parameter of the device housing of the laser distance measuring device, for example, to a symmetry axis or an edge of the device housing. Alternatively, the emission direction of the laser beam capable of being emitted can also serve as a reference parameter. "Axial" can be understood herein in particular as "in the emission direction". "Radial" can be accordingly understood as "perpendicular to the emission direction along a straight line toward the outside, which intersects the emission direction". "Rotation" can be understood in particular as a direction which is defined by a rotation around the emission direction along a circle in a plane perpendicular to the emission direction. Consequently, an "axial lock" allows for an attachment device to be fixedly locked in the axial direction. "Radial lock", on the other hand, allows for an attachment device to be fixedly locked in the radial direction. Finally, "spin-lock" allows for an attachment device to be fixedly locked against a rotation, here, around the emission direction.

Thus, the at least one coupling element (regardless of whether it is a coupling element of the device-side coupling interface or of the attachment-side coupling interface), in particular, effects an axial lock and/or a radial lock and/or a spin-lock of the attachment housing of the attachment device on the device housing of the laser distance measuring device. In particular, the at least one coupling element can simultaneously be used for the axial lock, for the radial lock and for the spin-lock.

As as alternative or in addition, an axial lock and/or a radial lock and/or a spin-lock of the attachment housing of the attachment device on the device housing of the laser distance measuring device can also be effected by an additional locking element of the device-side and/or the attachment-side coupling interface. For example, in one exemplary embodiment, a locking element for an axial lock and a locking element for a spin-lock can respectively be provided, wherein the locking element for the axial lock and the locking element for the spin-lock are designed differently from each other. The at least one locking element may be designed herein in particular as a non-positive-locking and/or positive-locking locking element.

In one embodiment of the handheld laser distance measuring device, the device-side coupling interface is set up to form an undercut when arranging the attachment device with an attachment-side coupling interface. Accordingly, the attachment-side coupling interface is also set up to form an undercut, in particular the same one when arranging the attachment device with the device-side coupling interface.

In one embodiment of the handheld laser distance measuring device, the device-side coupling interface is implemented as a positive-locking connection element of a bayonet connection, in particular as a recess of a bayonet connection. Accordingly, the attachment-side coupling interface in a corresponding embodiment of the attachment device is implemented as a positive-locking connection element, preferably complementary to the positive-locking connection element of the device-side coupling interface, of a bayonet connection in particular as a bolt or pin of a bayonet connection.

In this way, the attachment device can be attached and locked to the laser distance measuring device in a particularly easy and reliable manner via a bayonet connection. In one embodiment, the bayonet connection can be locked by a blocking element. In an exemplary embodiment, the device-side coupling interface can comprise a flange ring, wherein the flange ring is connected to the device housing in a rotationally rigid manner (or as an alternative to the attachment housing), while the corresponding (complementary) attachment-side coupling interface (or correspondingly the device-side coupling interface) comprises an attachment ring, which is engaged by a rotary and axial relative movement of the attachment ring with relation to the flange ring when arranging the attachment device in such a way that the attachment ring and the flange ring together form an undercut.

In one embodiment of the handheld laser distance measuring device, the device-side coupling interface is implemented as a positive-locking and non-positive-locking connection element of a detent connection, in particular as a recess of a detent connection. Accordingly, the attachment-side coupling interface in a corresponding embodiment of the attachment device is implemented as a, preferably corresponding or complementary, positive-locking and non-positive-locking connection element of a detent connection, in particular as a detent tab or detent hook of the detent connection.

In one embodiment, the detent connection can be implemented as an elastic detent connection with at least one elastic positive-locking and non-positive-locking connection element. Such a detent connection has the advantage that it can be easy to handle since no additional tool is required as an aid for arranging or detaching the attachment device. The easy handling of the detent connection is especially apparent in one embodiment, in which the positive-locking and non-positive-locking connection element is designed to automatically function in a detent manner, i.e. without further manual actuation. This means that, already when setting the attachment device on the device housing of the laser distance measuring device, the positive-locking and non-positive-locking connection element of the attachment-side coupling interface engages into corresponding or complimentarily formed means of the device-side coupling interface on the device housing in a detent manner. The detent connection between attachment device and device housing of the laser distance measuring device herein becomes automatically effective, i.e. without any other manipulation or influence of any other aid ("autolock function"). For example, this can take place by means of a spring-loaded detent connection in such a way that a spring-loaded (or spring-mounted) detent means, for example a detent tab or a detent hook, is engaged in a force-guided manner against the force of the spring-loaded positive-locking and non-positive-locking connection element with a corresponding means on the device housing, for example a recess, when joining together the attachment device and the laser distance measuring device. The spring-loaded positive-locking and non-positive-locking connection element can, for example, be a spring-loaded detent hook with a guide bevel, wherein the guide bevel of the detent hook interacts with a corresponding guide bevel on the device housing of the laser distance measuring device in such a way that the spring-loaded detent tab or the spring-loaded detent hook is tensioned already when setting the attachment device on the device housing without further interaction and engages or snaps into the recess.

A further advantage of a detent connection is that the snapping of the positive-locking and non-positive-locking connection element into corresponding means on the device housing can take place in an audible manner so that it is indicated to the operator of the laser distance measuring device during the snapping by means of a clicking noise that the attachment device is fully and properly connected and locked to the laser distance measuring device.

It should be noted at this point that the descriptions of an embodiment where the device-side coupling interface is implemented as a recess and the attachment-side coupling interface is implemented as a detent hook, can also be naturally carried over to a symmetrically designed embodiment where the device-side coupling interface is implemented as a detent hook and the attachment-side coupling interface is implemented as a recess.

For detaching the detent connection, and thus for removing the attachment device from the laser distance measuring device, the at least one positive-locking and non-positive-locking connection element, in particular the detent tab or the detent hook, can be actuated by hand. The positive-locking and non-positive-locking connection element can thereby be attached on the coupling interface in such a way that it can be manually actuated directly from the outside or indirectly via an unlocking element, for example an unlocking button in the form of a pushbutton, a slide or the like, by the operator of the laser distance measuring device. In the case of a spring-loaded detent connection, the operator of the manual machine tool must apply force against the spring force of the spring-loaded positive-locking and non-positive-locking connection element in order to disengage the positive-locking and non-positive-locking connection element with the corresponding means on the device housing (or vice versa) of the laser distance measuring device.

As means for a detent connection, different embodiments can be fundamentally implemented. The detent means can, for example, be designed in itself to be spring-loaded.

However, it can also be designed to be spring-biased (spring-mounted), for example in the form of a spring-biased bolt, hook or the like.

In one embodiment of the handheld laser distance measuring device, the device-side coupling interface comprises anti-rotation protection, which effects an arrangement of the attachment device in a predetermined orientation. As as alternative or in addition, in one embodiment of the attachment device, the attachment-side coupling interface comprises anti-rotation protection, which effects an arrangement of the attachment device in a predetermined orientation.

In one embodiment of the handheld laser distance measuring device, the device-side coupling interface comprises a guide, in particular a conically formed guide, which effects a play-free arrangement of the attachment device in a predetermined orientation, in particular based on the laser beam of the laser distance measuring device. As as alternative or in addition, in one embodiment of the attachment device, the attachment-side coupling interface comprises a guide, in particular a conically or obliquely shaped guide, which effects a play-free arrangement of the attachment device in a predetermined orientation, in particular based on the laser beam of the laser distance measuring device.

"Anti-rotation protection" is to be understood in particular as meaning a device or a means of a coupling interface which permits the arrangement of the attachment device on the laser distance measuring device only in a preferred orientation. For example, anti-rotation protection can be effected by a certain shaping of the coupling interface, in particular, for example, by a special mold and/or a special eccentric arrangement. In this way, rotational positions of the attachment device can be ruled out based on the laser distance measuring device. Favorably, the attachment device can only be arranged in a single position or orientation on the laser distance measuring device. Thus, a particularly secure arrangement of the attachment device can be implemented on the laser distance measuring device. Incorrect or improper handling in particular an improper arrangement of the attachment device on the laser distance measuring device, can be avoided in this way.

Furthermore, a guide, in particular a conically or obliquely shaped guide, can effect a more precise arrangement of the attachment device in a predetermined orientation, in particular based on the laser beam of the laser distance measuring device. By means of the guide, the attachment device is favorably guided into a precise defined arrangement position and/or arrangement orientation so that a favorably precisely aligned arrangement of the attachment device is made possible on the laser distance measuring device. This is particularly relevant for attachment devices where a precise orientation of optical elements relative to the laser beam capable of being emitted is required.

In one embodiment, different means can be provided for the anti-rotation protection and for the guide. Alternatively, a single means, for example a detent means, can be designed in such a way that it simultaneously implements anti-rotation protection as well as a guide.

In one embodiment of the handheld laser distance measuring device, the device-side coupling device comprises a device-side energy interface to form an energy connection of the attachment device on the laser distance measuring device, in particular on a control device and/or on an energy supply device of the laser distance measuring device. Accordingly, in one embodiment of the attachment device, the attachment-side coupling device also comprises an attachment-side energy interface to form an energy connection of the attachment device on the laser distance measuring device, in particular on a control device and/or on an energy supply device of the laser distance measuring device.

A (device-side/attachment-side) "energy interface to form an energy connection" is to be understood in particular as meaning a (device-side/attachment-side) electrical interface which is designed to effect an electrical connection of the attachment device on the laser distance measuring device, in particular on an energy supply device and/or on a control device of the laser distance measuring device. In particular, the energy interface is designed to transmit at least power and/or a current. In one embodiment, the energy interface to form an energy connection, coupled with the mechanical connection, of the attachment device is set up on the device housing of the laser distance measuring device. A "connection coupled" with the mechanical connection, in this context, should be understood in particular as meaning an energy connection established at least substantially simultaneously with the mechanical connection. Preferably, the mechanical connection and the energy connection are provided to be established in an identical connection-establishing movement. Preferably, the device-side coupling device and the attachment-side coupling device are provided to effect the mechanical connection and the energy connection of the attachment device on the laser distance measuring device.

In one embodiment, the energy interface of the device-side coupling device and/or of the attachment-side coupling device comprises, for the transmission of power and/or a current, at least one contact element, preferably at least two contact elements, in particular two plug elements, for the electrical contacting of the attachment device with the laser distance measuring device. Corresponding contact elements can be implemented herein in the form of a contact surface. The device-side contact elements are herein connected to the energy supply device and/or to the control device of the laser distance measuring device.

In one embodiment, the energy transfer from the energy supply of the laser distance measuring device to the attachment device can also occur via an inductively designed energy interface. Favorably, in such a way, exposed electrical contacts can be dispensed with.

In this way, the device-side coupling device is set up to transmit electrical energy to an electrical energy utilization unit of an attachment device arranged on the laser distance measuring device.

In particular, in this way, an energy supply device of the laser distance measuring device can simultaneously be used as the energy supply of an attachment device arranged on the laser distance measuring device. For example, energy can be delivered to the attachment device, in particular during the operation of the laser distance measuring device. Thus, favorably, a separate energy supply of the attachment device, in particular a separate battery or the like, can be saved by using the energy supply device of the laser distance measuring device.

In one embodiment of the handheld laser distance measuring device, the device-side coupling device comprises a device-side data communication interface to form an information-transmitting connection of the attachment device on the laser distance measuring device, in particular on a control device and/or on an output device of the laser distance measuring device. Accordingly, in one embodiment of the attachment device, the attachment-side coupling device also comprises an attachment-side data communication interface to form an information-transmitting connection of the attachment device on the laser distance measuring device, in particular on a control device and/or on an output device of the laser distance measuring device.

A (device-side/attachment-side) "data communication interface to form an information-transmitting connection" is to be understood in particular as meaning a (device-side/attachment-side) interface which is designed to effect a connection on a signal-engineering level of the attachment device on the laser distance measuring device, in particular on a control device and/or on an output device of the laser distance measuring device. The data communication interface enables wired and/or wireless communication by means of which the attachment device can send, for example, measurement results and/or working parameters to the laser distance measuring device and/or can receive said results and/or parameters from said laser distance measuring device. In one embodiment, the data communication interface may use a standardized communication protocol to transmit electronic, in particular digital, data. Favorably, the data communication interface includes a wireless interface, in particular, for example, a WLAN, Bluetooth, infrared, NFC, RFID, GSM interface or another wireless interface that appears to be useful to a person skilled in the art. Alternatively, the data communication interface may also have a wired adapter, for example, a USB or micro-USB adapter or another adapter that appears to be useful to a person skilled in the art.

In one embodiment, the data communication interface is set up to form an information-transmitting connection, coupled with the mechanical connection, of an attachment device. A "connection coupled" with the mechanical connection, in this context should be understood in particular as meaning an information-transmitting connection established at least substantially simultaneously with the mechanical connection.

In this way, in one embodiment of the handheld laser distance measuring device, the device-side coupling device is set up to transmit information, in particular data information, to an attachment device arranged on the laser distance measuring device or from an attachment device arranged on the laser distance measuring device. Furthermore, in this way, in one embodiment of the attachment device, the attachment-side coupling device is set up to transmit information, in particular data information, to the control device of the laser distance measuring device.

In this way, data information generated by means of the attachment device can be favorably transmitted to the control device of the laser distance measuring device and further processed by said control device. Further processing refers herein to all conceivable process steps of data processing, data output, data storage or the like. In particular, data information can be output in an intuitively understandable, in particular processed, way to the operator of the laser distance measuring device.

Furthermore, an additional functionality, for example a temperature-measurement functionality, can be provided by means of the arrangement of the attachment device on the laser distance measuring device, wherein if appropriate—depending on the provided additional functionality of the attachment device—detected data information can be transmitted to the control device of the laser distance measuring device and be further processed by said control device.

In one embodiment of the handheld laser distance measuring device, the control device is furthermore set up to detect an arranged state of an attachment device and/or to detect a type of an arranged attachment device, in particular to detect a mechanical and/or electrical identifier of an attachment device.

In this way, it can be implemented that the laser distance measuring device performs a function as a result of detecting an arranged attachment device and/or as a result of detecting a type of an arranged attachment device and/or changes or assumes an operating state. An operating state of the laser distance measuring device should be referred to in particular as information processing, information output and/or information input and/or information entry, in the context of which the laser distance measuring device applies an operating program and/or a regulation routine and/or a control routine and/or an evaluation routine and/or a calculation routine and/or a display routine or the like. In particular, the application of an operating state has an effect on the function of the laser distance measuring device.

A mechanical identifier can be implemented, for example, by means of a switch or pushbutton, which is actuated when arranging an attachment device. Preferably, such an electrical and/or mechanical pushbutton being connected on a functional level to a detent device can be implemented for the reversible holding and removal of the attachment device on the device housing of the laser distance measuring device so that, in the case of an arrangement of the attachment device, the detent element holds the attachment device in its position while the electrical and/or mechanical pushbutton simultaneously detects the presence of the attachment device, in particular its arranged state.

In addition or as an alternative, by using an electrical identifier, the arrangement of an attachment device on the laser distance measuring device can be detected in a particularly reliable manner. For example, an electrical identifier can be implemented in a simple way by means of integrating a coding resistor in an attachment device. By using a detection or readout circuit in the laser distance measuring device, a resistance value of the coding resistor can be read out, which, depending on the obtained value, can be interpreted as an indicator for an arranged attachment device. In this way, depending on the determined resistance value, an arrangement of a respective attachment device on the laser distance measuring device can be detected and also furthermore distinguished among different attachment devices.

In one embodiment, the laser distance measuring device comprises means for detecting an arranged state in the form of a sensor-counterpart pair, in particular a sensor-actuator or a sensor-actuator pair, and/or an electrical pushbutton and/or a mechanical pushbutton. A sensor-counterpart pair is to be understood in particular as meaning a two-part system consisting of a sensor as well as a suitable counterpart element so that, when detecting a physical characteristic of the counterpart element by means of the sensor, the sensor detects the presence of the counterpart element. In particular, this also includes sensor-actuator pairs. Examples of such sensor-counterpart pairs are, in particular, magnetic-fieldsensitive sensors in combination with magnets, capacitively functioning sensors in combination with dielectrics, temperature-sensitive sensors in combination with elements emitting heat radiation or light-sensitive sensors in combination with elements emitting light. In particular, it should be noted that the sensor of the sensor-counterpart pair is not identical to the sensor for measuring the air humidity and/or the ambient temperature. In this sense, the sensor of the sensor-counterpart pair represents an additional sensor, which additionally extends the functionality of the laser distance measuring device. By using such a sensor-counterpart pair, a reliable detection of the arranged state of an attachment device can be implemented. In one embodiment of the laser distance measuring device, the energy required for the operation of an electrical circuit, in particular of the sensor of the sensor-counterpart pair, can be taken directly from the energy supply device of the laser distance measuring device.

In one embodiment of the laser distance measuring device according to the invention, the means for detecting the arranged state of the at least one attachment device comprise a magnetic-field-sensitive sensor, in particular a Hall sensor. A Hall sensor is a magnetic-field-sensitive sensor, which represents a preferred embodiment of a spacing-sensitive sensor of the sensor-counterpart pair. A sensor-counterpart pair can be implemented in combination with a magnet in this way, which pair permits a particularly reliable detection of the arranged state. For this purpose, for example, the Hall sensor can be integrated into the housing of the laser distance measuring device, while the magnet as a counterpart element is a component part of the attachment device. The magnet as a component part of the attachment device can also be used, in particular, for the stable arrangement of the attachment device on the laser distance measuring device. In this way, mechanical components for implementing a holding or detent device can be dispensed with. Furthermore, by using a hall-sensor-magnet pair, mechanical components for detecting the arranged state of the at least one attachment device can favorably be dispensed with. The absence of (electro)mechanical components, in particular retaining elements, hooking elements, clamping elements, detent elements, pushbuttons or the like, also has an advantageous effect on the continuous preservation of the functional characteristics of both the attachment device as well as the housing, especially since functional limitations or even loss of function as a result of dirt or wear of the mechanical elements—typically associated with loss of contact and/or hooking and wedging of the elements—are avoided.

In one embodiment of the laser distance measuring device according to the invention, the means for detecting the arranged state of the at least one attachment device comprise a capacitive or an ultrasonic-sensitive, in particular spacing-sensitive, sensor. By using capacitive or ultrasonic-sensitive sensors, in particular capacitive or ultrasonic-sensitive sensor-counterpart pairs, alternative cost-effective embodiments of the laser distance measuring device according to the invention can be implemented where an arranged state is reliably detected.

In one embodiment of the laser distance measuring device according to the invention, the means for detecting the arranged state of the at least one attachment device comprise a pushbutton, which is actuated in an arranged or distant state of the attachment device. Such a pushbutton, in particular a mechanical and/or electrical pushbutton, represents an advantageously simple implementation of the means for detecting an arranged state. Preferably, such a pushbutton, in particular electrical and/or mechanical pushbutton, can be designed together with means provided for the stable arrangement of the at least one attachment device, in particular retaining elements, hooking elements, clamping elements or detent elements. Particularly preferably, an electrical pushbutton detects its arranged state by way of short circuiting or closing an electrical switching circuit as a result of arranging the attachment device. Therefore, it is possible to implement an embodiment of the means for detecting the arranged state which embodiment is reliable and can be easily implemented on a production level and therefore is economically particularly inexpensive.

In one embodiment of the handheld laser distance measuring device, the control device is furthermore set up to output an electrical signal to an output device of the laser distance measuring device depending on the detection of an arranged state of the attachment device and/or depending on the detection of the type of the arranged attachment device, and/or to control and/or to regulate an energy supply of the device-side electrical coupling device, in particular, an energy supply of the attachment device arranged on the laser distance measuring device.

The type of an arranged attachment device is to be understood in particular as meaning the different designs of the attachment device, for example as an attachment device with temperature-measurement functionality or with air-pressure measurement functionality.

Preferably, the signal can be further processed in this way via the detection of the arranged state of the at least one attachment device and/or of the type of the arranged attachment device by means of the control device of the laser distance measuring device. Various embodiments are conceivable where the signal generated by the means is evaluated, passed on and/or output to an operator of the laser distance measuring device.

In particular, the control device of the laser distance measuring device is provided to evaluate at least one piece of information, in particular transmitted by means of the data communication interface, of an attachment device. Thereby, for example, control and/or regulation variables can be set specifically for the arranged attachment device and thus use of the at least one attachment device can be optimized. In addition, a high level of operational safety can be achieved. Preferably, the control device is intended to determine a type, a kind or a variant of the attachment device, in particular, by means of an assignment of a parameter to a reference value, and/or to control and/or to regulate a current provided for the energy interface and/or a voltage provided for the energy interface depending on a type, a kind or a variant of the attachment device, in particular, in an at least essentially automatic or semiautomatic manner. In a favorable manner, in at least one operating state, the control device controls and/or regulates a power supply of the attachment device, in particular a power supply of the energy interface, depending on the detection of an arranged state of the attachment device and/or depending on the detection of the type of the arranged attachment device. Thus, the laser distance measuring device can be operated with the attachment device in a particularly safe and reliable manner. A particularly efficient and/or particularly resource-saving operation of the laser distance measuring device with the attachment device can be achieved. Operator comfort can be further enhanced.

In particular, in one embodiment of the laser distance measuring device, means can be provided which allow, as a result of the detection of an arranged attachment device and/or as a result of the detection of a type of an arranged attachment device, a voltage converter device for adjusting an output voltage of the at least one energy supply device to be activated. Such means can comprise, in particular, electrical circuits, switching circuits, electrical switches and/or mechanical switches. In this context, a "voltage converter device" is to be understood in particular as meaning a DC-voltage converter comprising an electrical circuit which converts a DC voltage supplied at the input of the device into a DC voltage with a higher, lower or inverted voltage level. In particular, the voltage converter device can comprise a DC-voltage converter based on inductive or capacitive effects. The voltage converter device is preferably used for the conversion of the output voltage or rated voltage of the energy supply device into an increased or decreased working voltage of an energy utilization unit of an attachment device arranged on the laser distance measuring device. Particularly favorably, in this way, it can be implemented that an attachment device arranged on the laser distance measuring device, in particular an energy utilization unit of the attachment device, receives an energy necessary for its operation (voltage, current) from the energy supply device of the laser distance measuring device, regardless of which input voltage the attachment device requires for operation.

As as alternative or in addition, the control device is provided to activate and/or to deactivate an emission of a laser beam depending on a type, a kind or a variant of an attachment device arranged on the laser distance measuring device, and/or to set a power, with which the laser beam is emitted.

Furthermore, depending on the detection of an arranged state of the attachment device and/or depending on the detection of the type of the arranged attachment device, further, diverse functions can be controlled and/or triggered. For example, an output of information, in particular, information provided by the arranged attachment device, can be initiated by means of an output device of the laser distance measuring device.

In particular, an indication that a certain attachment device is in an arranged state can be output to an operator of the laser distance measuring device using the output device of the laser distance measuring device, in particular in an acoustic, optical, tactile or any other way. Favorably, a warning of the operator of the laser distance measuring device can take place in this way, which warning alerts the operator to possible faulty measurements, inaccurate measurements and/or to operating instructions. In addition, it may be provided, for example, to block an operation of the laser distance measuring device.

Furthermore, it is possible to use the electrical signal as a basis for carrying out at least one additional function of the laser distance measuring device. A multitude of such functions, which are carried out depending on the detection of the arranged state of the attachment device and/or the type of the arranged attachment device, are conceivable. For example, function modes of the laser distance measuring device can be implemented when detecting an arranged state of a certain attachment device. As as alternative or in addition, functional extensions can also be provided, for example, falling back on calibration data stored in the device for the calibration of the corresponding attachment device.

By using the coupling device, a simple replacement of the respective attachment device can be implemented, so that the laser distance measuring device can be equipped with respectively different attachment devices depending on the situation. Favorably, an attachment device can be selected by an operator of the laser distance measuring device before performing a function, in particular removed, replaced or arranged. In this way, the laser distance measuring device according to the invention in conjunction with an attachment device according to the invention permits the provision of an additional functionality, which, as an alternative to the distance measurement of the laser distance measuring device using a selectable attachment device, also makes possible for the use of the laser distance measuring device to perform further tasks.

The selection of the attachment device is made herein by selecting a situation-dependently respectively preferred attachment device, which is then arranged on the laser distance measuring device in a reversibly detachable manner.

It should be mentioned that, in one embodiment of the laser distance measuring device and/or the attachment device, it is also conceivable to arrange more than one attachment device on the laser distance measuring device. In particular, it is conceivable to arrange a plurality of attachment devices consecutively on the laser distance measuring device in such a way that, in the sense of a series coupling, any further attachment device is arranged in a reversibly removable manner on an attachment device already arranged on the laser distance measuring device. For example, in such a way, more than one additional functionality of the laser distance measuring device can be provided.

An "additional functionality" is to be understood in particular as meaning a functionality of the laser distance measuring device which, in addition or as an alternative to the functionality of the contactless distance measurement of the laser distance measuring device, can be provided using an attachment device if the laser distance measuring device is provided, in particular equipped, with the attachment device specific to a respective additional function—the attachment device thereby is arranged on the laser distance measuring device. In particular, an attachment device can provide an additional or alternative tool functionality and/or an additional or alternative measurement functionality.

Thus, a particularly versatile laser distance measuring device can be provided. In particular, attachment devices with electrical additional functions can be used, wherein the energy supply of the attachment device is favorably provided using the energy supply device of the laser distance measuring device. Resources, such as for example an energy supply of the laser distance measuring device, can be used in a particularly economic manner. An additional energy supply for the attachment device can be dispensed with. In addition, a high level of operator comfort can be achieved.

In one embodiment, an attachment device—similar to the laser distance measuring device—can also include electronic components such as for example a control device, an energy supply device, a sensor device or the like. Alternatively, an attachment device may also be designed without electronic components, for example as an attachment device by means of which the laser beam emitted by the laser distance measuring device is deflected. In such an exemplary embodiment, the attachment device, for example, can comprise only a mirror.

In one embodiment, the attachment device does not comprise any structural elements that are already provided in the laser distance measuring device. In such a way, in particular, additional operator control elements and/or an additional energy supply device and/or an additional control device or the like can be dispensed with. In this way, a particularly lightweight and compact attachment device can be realized. In particular, if such structural elements are required for the functionality of the attachment device, appropriate structural elements of the laser distance measuring device can be fallen back on, wherein an energy and/or an information-transmitting connection is established using the energy interfaces or the data communication interfaces. For example, thus, a measurement value determined by an attachment device can be transmitted to the control device of the laser distance measuring device and output by said laser distance measurement device to an operator of the laser distance measuring device using its output device.

In one embodiment of the attachment device, the attachment device is set up to deflect an emitted laser beam of the laser distance measuring device in a state arranged on the laser distance measuring device using an optical element, in particular using a mirror, preferably to deflect it at an angle of 90°.

In this way, the direction in which the laser distance measuring device performs a distance measurement can be changed or adjusted in a particularly simple way. Favorably, the attachment device or the optical element is swivel-mounted around that axis which corresponds to the emission direction of the laser beam without an attachment device. In such a way, the laser beam deflected at an angle of 90° can be rotated around that axis into which the laser distance measuring device emits the laser beam without an attachment device. The deflection of the laser beam can be carried out using any beam-forming and/or beam-steering optical elements, in particular, lenses, diffractive elements, mirrors, reflectors, optically transparent disks or the like for example.

In one embodiment of the attachment device, the attachment device is set up to deflect an emitted laser beam of the laser distance measuring device in a state arranged on the laser distance measuring device using an optical element, in particular, using a reflecting conical mirror, in such a way that a laser line that can be projected on a remote object results, in particular a laser line that can be projected on a remote object across an angular range of 360° results.

Thereby, the conical mirror comprises a conical axis and is designed to convert the laser beam, which is emitted by the laser distance measuring device, preferably coaxially to the conical axis, in the direction of the reflecting conical mirror, into a laser plane, which is then emitted, in particular is emitted across an angular range of 360°. Thus, by using the conical mirror, the laser beam can be converted into the laser plane in an easy and uncomplicated manner. Favorably, the laser distance measuring device can thereby be used as a level device, in particular as a so-called 360°-line laser, using the attachment device.

In one embodiment of the attachment device, the attachment device is set up to deflect an emitted laser beam of the laser distance measuring device in a state arranged on the laser distance measuring device using at least one optical element, in particular using at least one cylinder lens, in such a way that a laser line that can be projected on a remote object results. Favorably, the laser distance measuring device can thereby be used as a level device, in particular, as a so-called line laser, using the attachment device. The use of a cylinder lens herein represents an economically particularly favorable way to generate a laser line that can be projected at least over a certain angular range.

In one embodiment of the attachment device, the attachment device is set up to deflect an emitted laser beam of the laser distance measuring device in a state arranged on the laser distance measuring device using at least one optical element, in particular, using at least two cylinder lenses, in such a way that two laser lines that can be projected on a remote object, that are preferably oriented with respect to one another at an angle of 90°, and that particularly preferably intersect with one another at an angle of 90° result. Favorably, the laser distance measuring device can thereby be used as a level device, in particular as a so-called crossline laser, using the attachment device.

In one embodiment of the attachment device, the attachment device comprises at least one electrical energy utilization unit, wherein the energy utilization unit can be supplied with energy in a state arranged on the laser distance measuring device by an energy supply device of the laser distance measuring device.

In one embodiment of the attachment device, the attachment device comprises a light source, in particular an LED. Favorably, the laser distance measuring device can thereby be used as an LED lamp or as a flashlight using the attachment device.

In one embodiment of the attachment device, the attachment device is set up to modify an emitted laser beam of the laser distance measuring device in a state arranged on the laser distance measuring device using at least one optical element, in particular, a filter, in such a way that an LED lamp functionality can be provided.

In one embodiment of the attachment device, the attachment device is set up to provide an additional or alternative functionality from a list of functionalities in a state arranged on the laser distance measuring device, which at least comprises: a measuring-tape functionality, a distance-measurement functionality, a temperature-measurement functionality, a moisture-measurement functionality, an air-pressure-measurement functionality, an air-humidity-measurement functionality, an air-temperature-measurement functionality, a carbon-dioxide-measurement functionality, a smoke-detection functionality, a vibration-detection functionality, a motion-detection functionality, a profile-depth-measurement functionality, a level functionality.

A measuring-tape functionality can be implemented, for example, using a tape that can be pulled out of the attachment device. This tape can be favorably guided on a self-resetting roller in the attachment housing. Favorably, the length of the tape pulled out of the attachment device can be electronically detectable and be output to an operator of the laser distance measuring device using the output device. Favorably, the laser distance measuring device can thereby be used, using the attachment device, for the simple determination of lengths and/or distances, which are not necessarily connectible by means of a straight line (curved surface or the like).

A distance-measurement functionality can be implemented, for example, using a wheel mounted in the corresponding attachment device and/or a mouse sensor for determining the position. This wheel or the mouse sensor detects a movement of the attachment device over a surface. Favorably, the length of the distance section covered by the attachment device can be electronically detectable and be output to an operator of the laser distance measuring device using the output device. Favorably, the laser distance measuring device can thereby be used, using the attachment device, for the simple determination of lengths of undefined distances on surfaces, which are not necessarily connectible by means of a straight line (curved surface or the like). Furthermore, clear distances can be easily traveled by an operator of the laser distance measuring device and thus their length can be determined.

A temperature-measurement functionality can be provided, for example, using a temperature sensor, for example an infrared temperature sensor. Favorably, the laser distance measuring device can thereby be used, using the attachment device, for the simple determination of temperatures, for example surface temperatures, body temperatures or the like. In addition, a determined temperature can be electronically detectable and can be output to an operator of the laser distance measuring device using the output device.

A moisture-measurement functionality can be provided, for example, by a moisture sensor, for example an ambient humidity sensor. Favorably, the laser distance measuring device can thereby be used, using the attachment device, for the simple determination of humidity, in particular ambient humidity. In addition, determined humidity can be electronically detectably and can be output to an operator of the laser distance measuring device using the output device.

An air-pressure-measurement functionality can be provided, for example, by an air-pressure sensor, an air-humidity-measurement functionality can be provided by an air-humidity sensor, an air-temperature-measurement functionality can be provided by an air-temperature sensor and a carbon-dioxide measurement functionality can be provided by a carbon-dioxide sensor. Favorably, the laser distance measuring device can thereby be used, using the attachment device, for the simple determination of an air pressure and/or air humidity and/or an air temperature and/or a carbon-dioxide concentration. In particular, the measurement values can be electronically detectable and can be output to an operator of the laser distance measuring device using the output device.

A smoke-detection functionality can be provided, for example, by a smoke sensor. Favorably, the laser distance measuring device can thereby be used, using the attachment device, for the monitoring of a space or the like with regard to a development of smoke. In the case of detecting smoke, a, for example acoustic, warning signal can be output to an operator of the laser distance measuring device.

A vibration-detection functionality and/or a motion-detection functionality can be provided, for example, using a vibration sensor or a motion sensor. Favorably, the laser distance measuring device can thereby be used, using the attachment device, for monitoring a space with respect to a movement or vibration. In the case of detecting vibrations and/or movements, a warning signal can be output to an operator of the laser distance measuring device.

A profile-depth-measurement functionality can be implemented, for example, using a slidable pin or the like (similar to a mechanical sliding gauge or a micrometer screw), in which a measurement value is generated depending on the distance. Favorably, the laser distance measuring device can thereby be used, using the attachment device, for the simple determination of depths, profile depths or the like.

A level functionality can be realized, for example, using a level. As as alternative or in addition, the level functionality may also be implemented as an electronic level, for example using an inertial sensor system, an acceleration sensor system, or the like. Favorably, the laser distance measuring device can thereby be used, using the attachment device, for the simple determination of a level state.

In one embodiment of the attachment device, the attachment device comprises a communication interface for wireless communication with an external data device, in particular for the transmission of information to an external data device or from an external data device. Favorably, by means of the communication interface, measurement results and/or working parameters can be sent from the laser distance measuring device and/or the attachment device to an external data device, for example to a smartphone, a tablet PC, a PC, a printer or other external devices that appear to be useful to a person skilled in the art, or can be received by said devices. In such a way, a transmission of data can be made possible, which can be used for a further evaluation of measurement signals detected using the attachment device. In addition, a wide range of additional functions can be made possible and integrated, which, in particular, also require direct communication with smartphones (especially via programmed apps) or similar portable data devices. These can comprise, for example, automatic mapping functions, firmware updates, data post-processing, data processing, data matching with other devices, etc. In particular, the communication interface can be implemented by means of a Bluetooth or WLAN or radio interface or the like.

In one embodiment, the device-side coupling interface, as well as the attachment-side coupling interface, furthermore, the device housing and the attachment housing, are matched to each other in such a way that the attachment device carries on a housing shape of the laser distance measuring device, in particular in a form-locking manner. For example, the device housing of the laser distance measuring device can be implemented as an essentially cuboid, rod-shaped housing with an elongation in the longitudinal direction, wherein an attachment device arranged on the device housing of the laser distance measuring device (or also a plurality of arranged attachment devices) carries on the housing shape in the longitudinal direction of the rod-shaped device housing. Here, the attachment device, preferably following the shape of the device housing (form-locking), is connected to the cuboid shape of the device housing of the laser distance measuring device.

Finally, a system consisting of at least one, in particular independently usable, handheld laser distance measuring device and at least one attachment device, preferably, a plurality of attachment devices, is proposed.

As already mentioned, it should be noted once again that the descriptions of the various interfaces (coupling interface, energy interface, data communication interface, etc.), which refer to concrete assignments of features to one of the correspondingly formed halves of the interface, of course also include identical versions where the features are correspondingly interchanged. For example, when describing a device-side coupling interface in the form of a detent tab and an attachment-side coupling interface in the form of a recess, a device-side coupling interface in the form of a recess and an attachment-side coupling interface in the form of a detent tab is to also similarly be understood.

FIGURES

The invention is explained in more detail in the following description by means of exemplary embodiments shown in the figures. The figures, the description and the claims contain numerous features in combination. The person skilled in the art will also advantageously examine the features individually and combine them into further useful combinations. The same reference numbers in the figures refer to the same elements.

Figure 2:
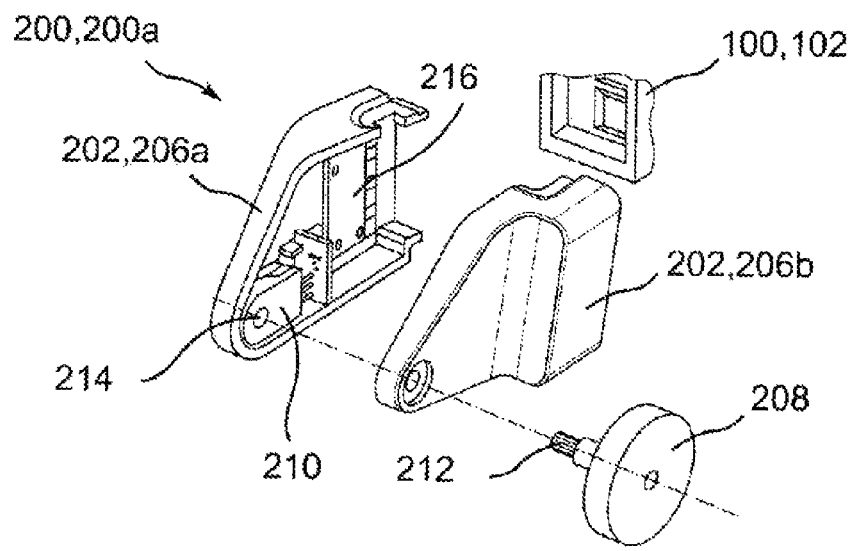
Figure 3:
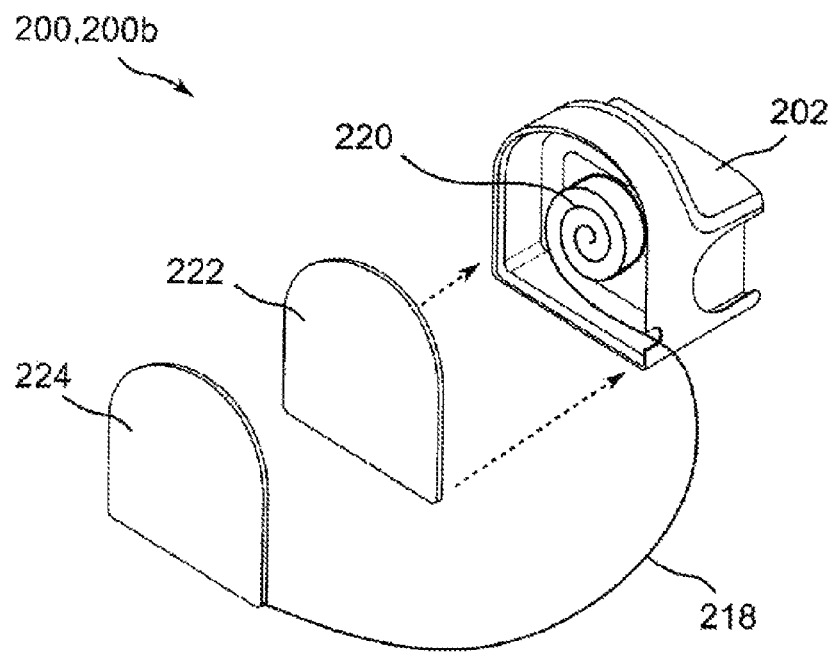
Figure 4:
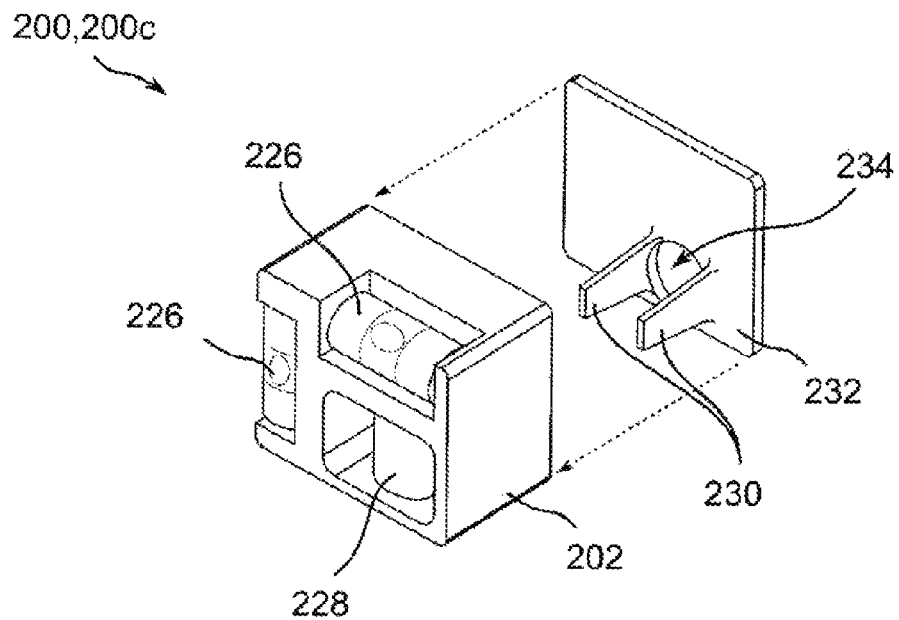
Figure 5:
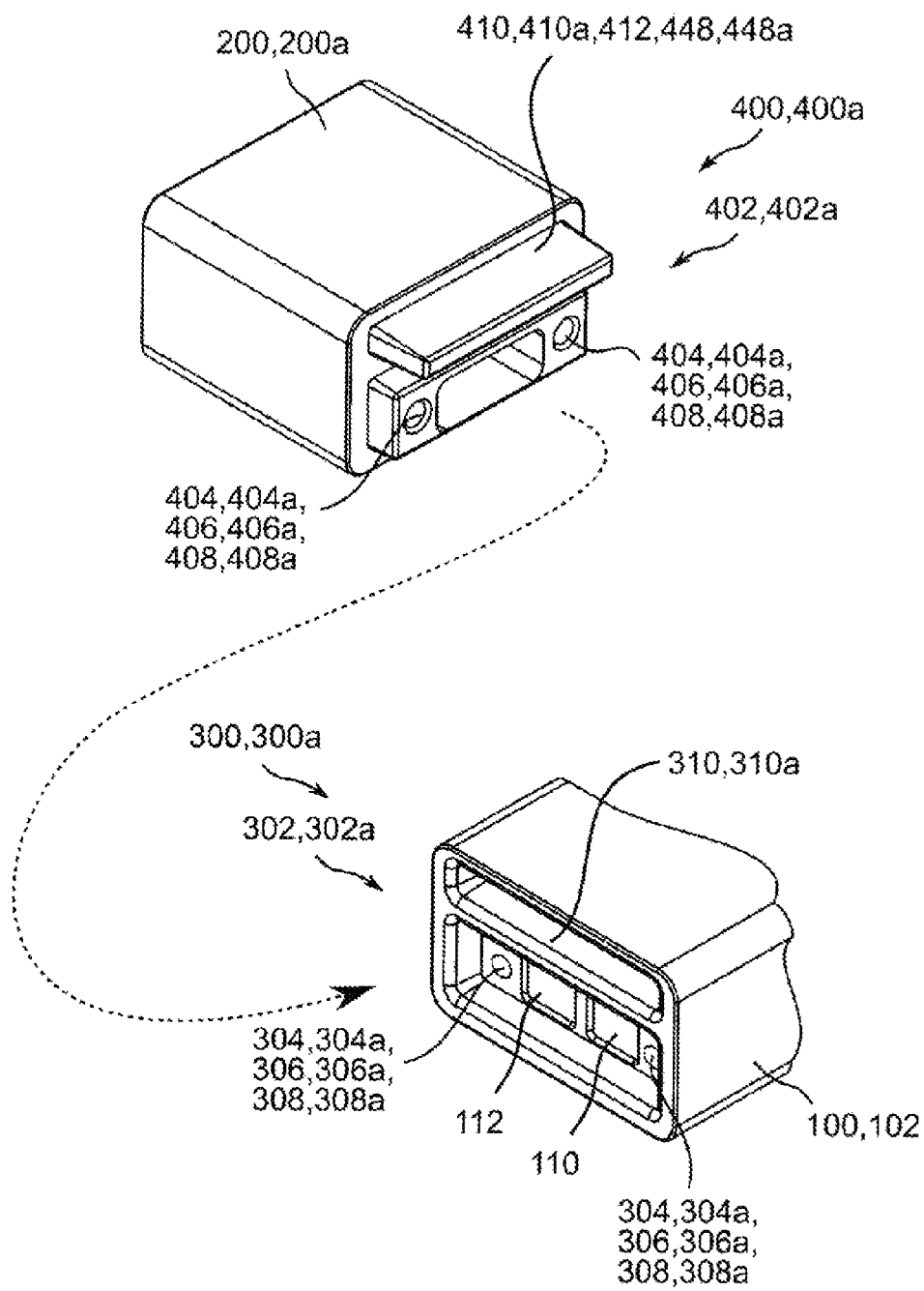
Figure 6:
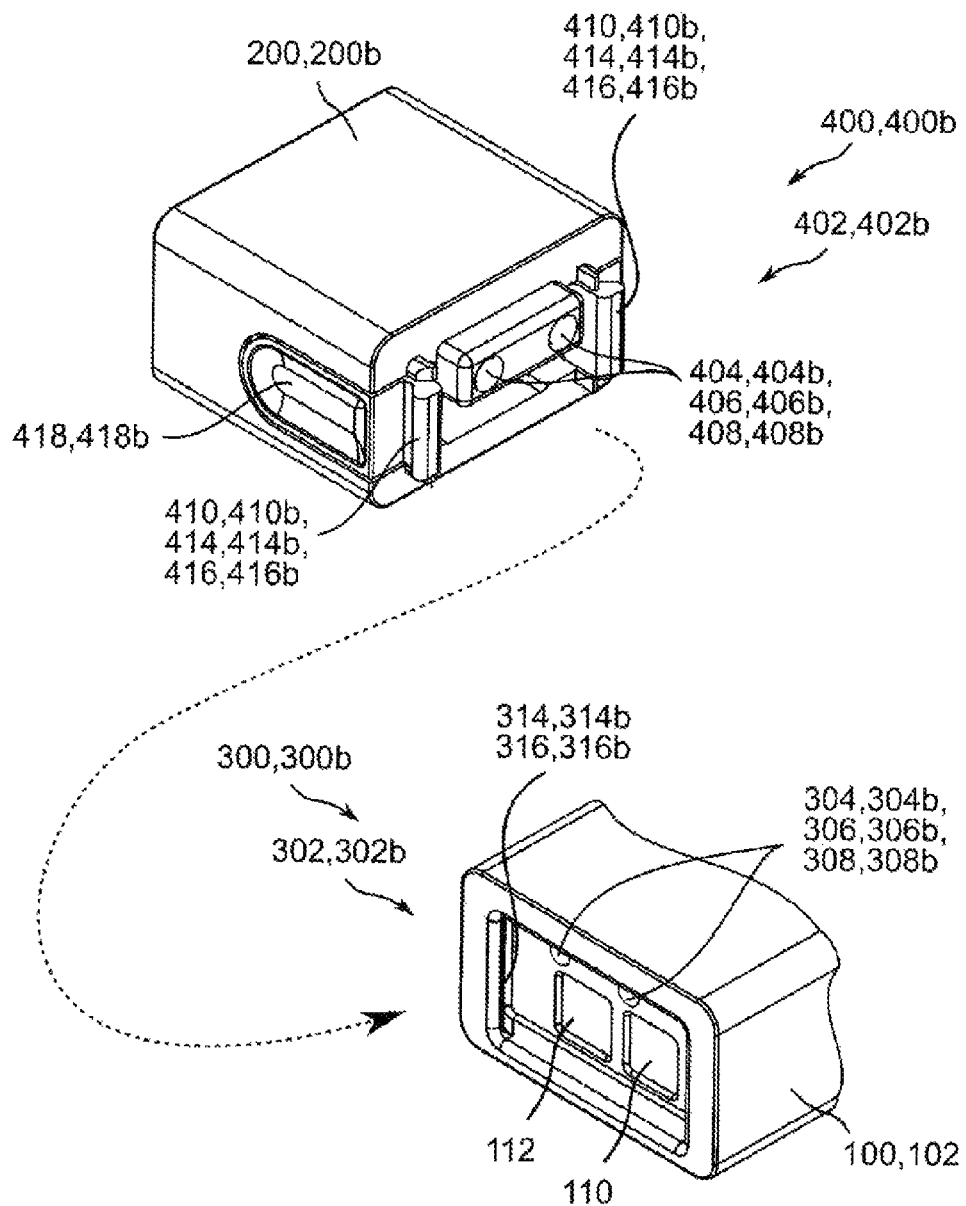
Figure 7:
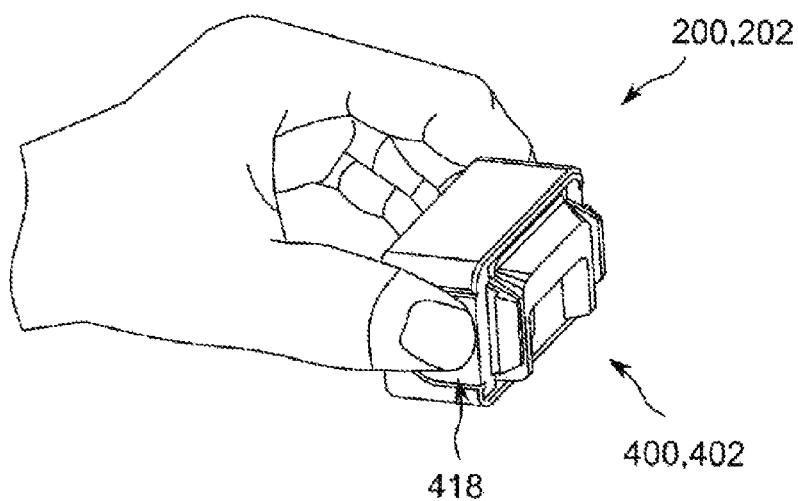
Figure 8A:
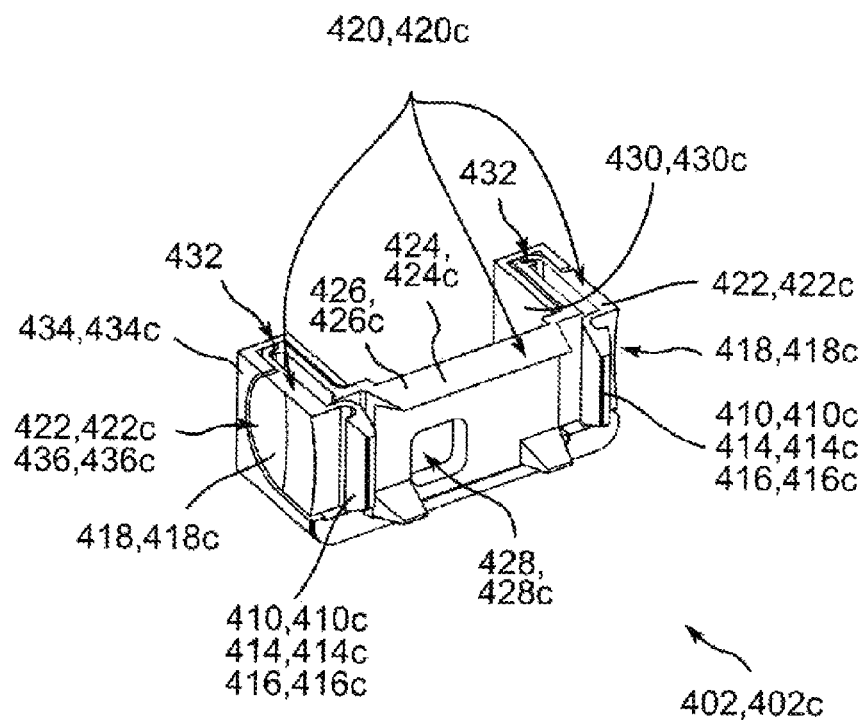
Figure 8B:
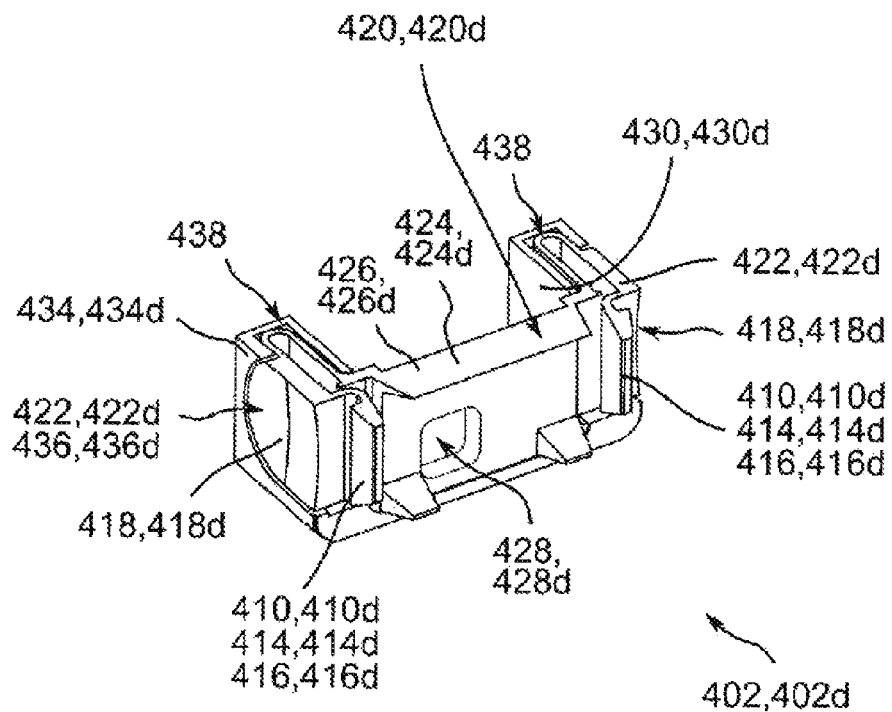
Figure 8C:
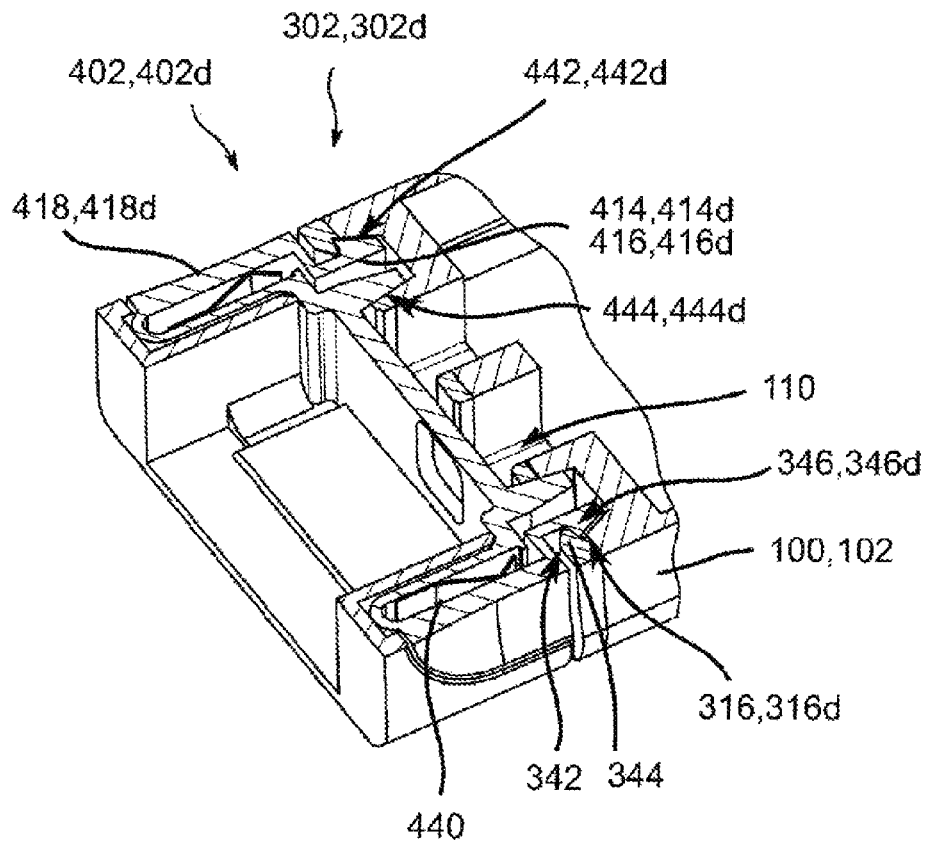
Figure 8D:
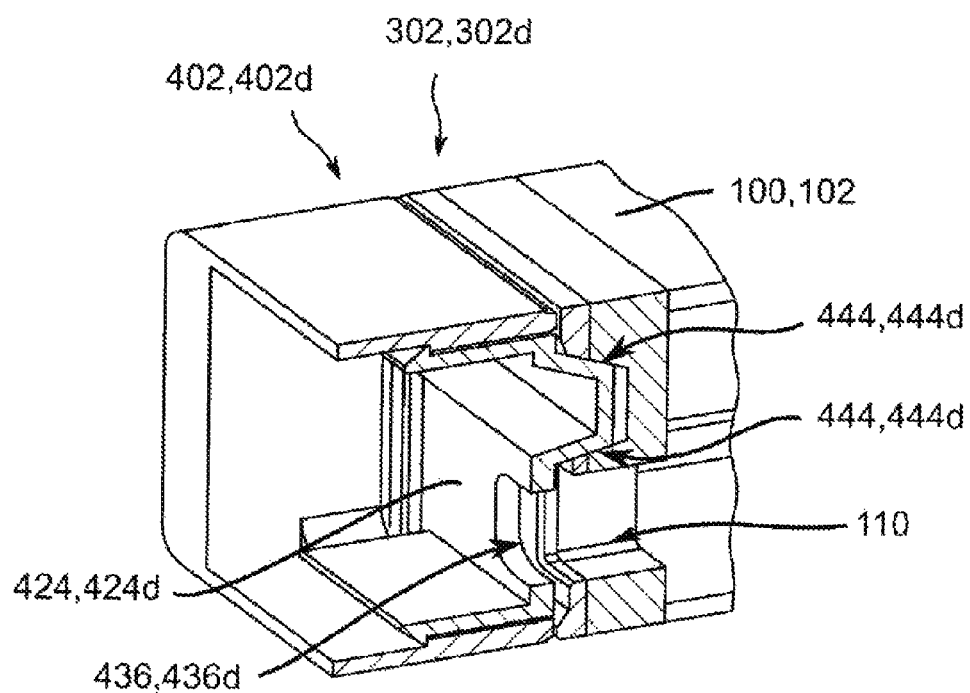
Figure 8E:
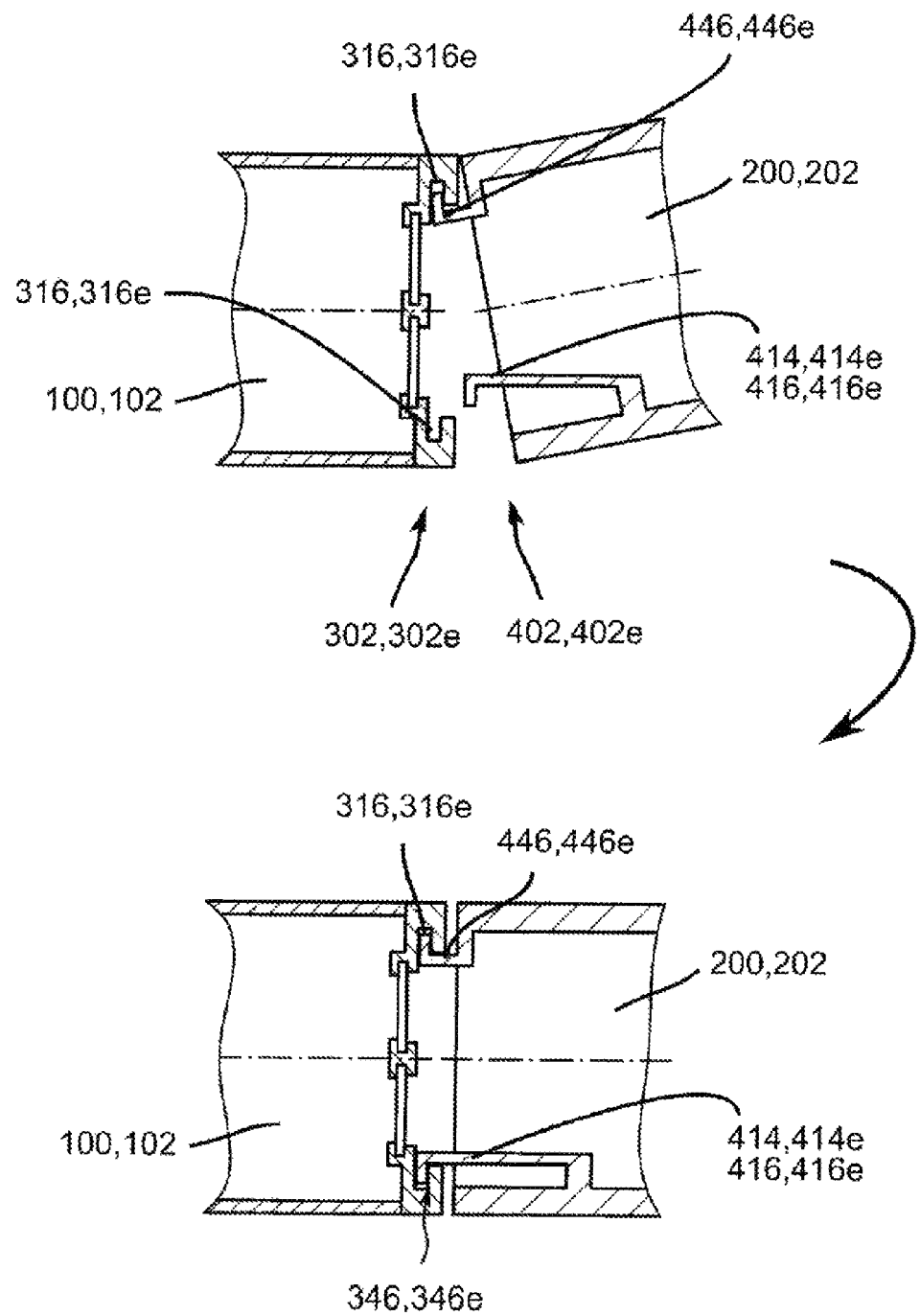
Figure 9:
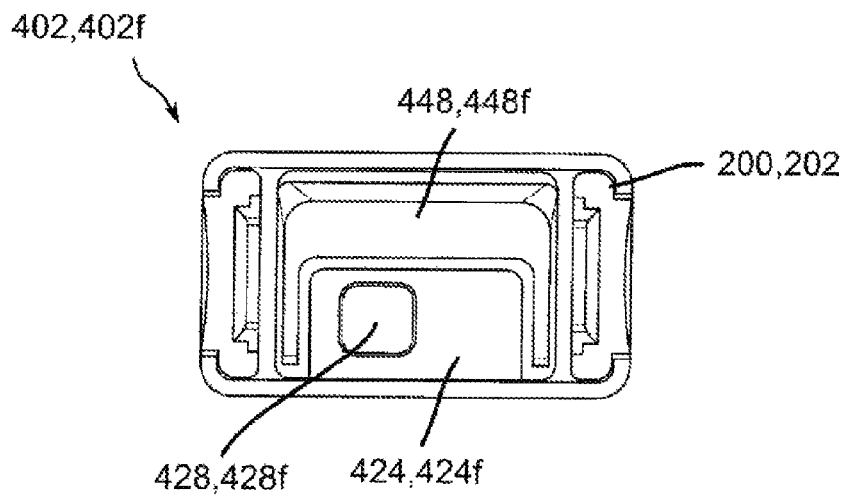
Figure 9:
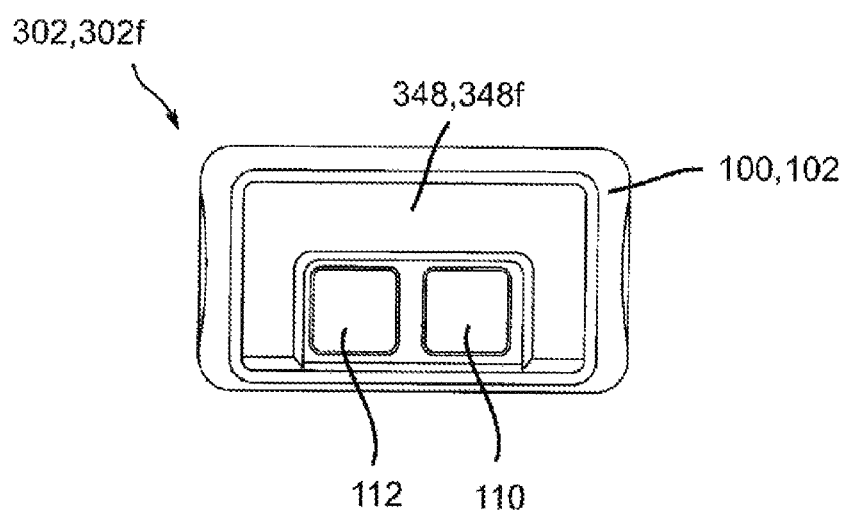

The figures show:

FIG. 1 a system consisting of a plurality of attachment devices and a handheld laser distance measuring device, FIG. 2 an embodiment of an attachment device that provides a distance-measurement functionality, FIG. 3 an embodiment of an attachment device that provides a measuring-tape functionality, FIG. 4 an embodiment of an attachment device that provides a level functionality, FIG. 5 an embodiment of an attachment-side coupling device and a device-side coupling device, FIG. 6 an alternative embodiment of an attachment-side coupling device and a device-side coupling device, FIG. 7 a schematic illustration for handling an attachment-side coupling device in accordance with FIG. 6, FIGS. 8a-8e sectional illustrations of embodiments of attachment-side coupling device, in particular, of attachment-side coupling interfaces FIG. 9 an embodiment of an attachment-side coupling interface and a device-side coupling interface, FIGS. 10a-10g alternative embodiments of attachment-side coupling devices and device-side coupling devices

DESCRIPTION OF THE EXEMPLARY EMBODIMENTS

FIG. 1 shows a system 10 according to the invention consisting of a handheld laser distance measuring device 100 for contactless distance measurement between the laser distance measuring device 100 and a remote object (not shown in more detail) and a plurality of attachment devices 200 in a schematic perspective illustration as an example.

The handheld laser distance measuring device 100 comprises a device housing 102, a touch-sensitive screen as an input and output device 104, as well as an actuating element 106 for switching the laser distance measuring device 100 on and off and for starting and/or terminating a measurement operation. The handheld laser distance measuring device 100 weighs less than 300 g in the embodiment shown, wherein the longest side of the device housing 102 measures less than 15 cm.

For the measurement of the spacing of the laser distance measuring device 100 to a target object (not shown in more detail here), during the operation of the laser distance measuring device 100, parallel laser radiation 108 is sent in the direction of the target object via transmitting optics 110 (see FIG. 8c or 8d for example), which, for example, consists of a lens system (not shown in more detail). The laser radiation reflected from a surface of the target object (not shown in more detail here) is directed via receiving optics 112 to a detector device (not shown in more detail here) and detected there. A light-travel time can be determined from a phase comparison carried out between the emitted laser radiation 108 and the laser radiation reflected by the surface of the remote object and the sought-after distance can be determined between the laser distance measuring device 100 and the target object in the corresponding distance measurement direction 114 (direction of the emission of the laser radiation 108) via the light speed. The laser radiation 108 is implemented in this exemplary embodiment as red laser light. The emitted laser radiation 108 generates, on the target object, a projected laser point.

The laser distance measuring device 100 comprises a laser diode within the device housing 102 for generating the laser radiation 108, a detector device, a control device and an energy supply device (each not shown in more detail). The energy supply device (not shown here in more detail) is used for the energy supply of the laser distance measuring device 100—as well as an attachment device 200 also arranged on the laser distance measuring device 100—wherein the energy supply device comprises a battery or an accumulator, preferably a lithium-ion accumulator, in an exemplary embodiment. In this exemplary embodiment, the detector device comprises at least one single-photon-avalanche diode (SPAD), preferably a SPAD array. The control device is intended to determine a light-travel time from a phase comparison carried out between the emitted laser radiation and the laser radiation returning from the surface of the target object and to determine the sought-after distance between the laser distance measuring device 100 and the target device via the light speed. Furthermore, the control device is intended to enable the operation of the laser distance measuring device 100, in particular, to control and/or to regulate the used components of the laser distance measuring device 100.

A determined distance-measurement value—and/or data information provided by an arranged attachment device 200, for example, a measurement value—can be further processed by the control device of the laser distance measuring device 100 and/or be output to an operator of the laser distance measuring device 100 by means of the output device 104.

Furthermore, in FIG. 1, a multitude of different attachment devices 200 for arrangement on a handheld laser distance measuring device 100 are shown. In the following, the different embodiments of attachment devices 200—if necessary for differentiation—are marked with the reference indexes "a" to "m". Each of the attachment devices 200 (correspondingly thus 200a-200m) comprises an attachment housing 202 (correspondingly 202a-202m), which at least substantially encloses, surrounds and/or holds the essential functional components of the respective attachment device 200—for example electronic and/or optical components. The attachment housing 202 herein represents an essential component part of the attachment device 200.

Each of the attachment devices 200 is set up for the reversible arrangement at least on the laser distance measuring device 100, wherein at least one additional functionality can be provided by means of the arrangement of the respective attachment device 200 on the laser distance measuring device 100. Thereby, the additional functionality can, in particular, provide an alternative or an additional functionality of the laser distance measuring device 100, which is not available without an attachment device 200.

The attachment devices 200 shown in FIG. 1, which can be used with the laser distance measuring device 100, comprise the following additional functionality in this exemplary embodiment: the attachment device 200a is set up to provide a distance-measurement functionality in a state arranged on the laser distance measuring device 100. The attachment device 200b is set up to provide a measuring-tape functionality in a state arranged on the laser distance measuring device 100. The attachment device 200c is set up to provide a level functionality in a state arranged on the laser distance measuring device 100. The attachment device 200d is set up to deflect the emitted laser beam 108 of the laser distance measuring device 100 in a state arranged on the laser distance measuring device 100 using at least one optical element, in particular using a cylinder lens, in such a way that a laser line that can be projected on a remote object results (an emitted subject is indicated with dashes). The attachment device 200e is set up to deflect the emitted laser beam 108 of the laser distance measuring device 100 in a state arranged on the laser distance measuring device 100 using at least two cylinder lenses in such a way that two laser lines that can be projected on a remote object and that intersect with one another at an angle of 90° result (two emitted subjects are indicated with dashes). The attachment device 200f is set up to deflect the emitted laser beam 108 in a state arranged on the laser distance measuring device 100 using a mirror (not shown in more detail). The attachment device 200f is provided to deflect the laser beam 108 using a reflecting conical mirror in such a way that a laser line that can be projected on a remote object results, in particular a laser line that can be projected on a remote object across an angular range of 360° results (an subject emitted over the angular range of 360° is indicated with dashes). The attachment device 200g is set up to provide a temperature-measuring functionality in a state arranged on the laser distance measuring device 100. The attachment device 200h is set up to provide an air-pressure-measurement functionality as well as an air-humidity-measurement functionality, as well as an air-temperature-measurement functionality, as well as a carbon-dioxide-measurement functionality in a state arranged on the laser distance measuring device 100. The attachment device 200i comprises a communication interface for wireless communication with an external data device, wherein the communication interface is set up to transmit information to an external data device or from an external data device. In the exemplary embodiment of the attachment device 200i shown, the communication interface is implemented as a WLAN interface. The attachment device 200j is set up to provide a moisture-measurement functionality in a state arranged on the laser distance measuring device 100. The attachment device 200k comprises a light source in the form of a plurality of LEDs 204, so that the laser distance measuring device 100 can thereby be used as a flashlight. The attachment device 200l is set up to provide an air-pressure-measurement functionality in a state arranged on the laser distance measuring device 100, in particular, for measuring a tire air pressure. The attachment device 200m is set up to provide a profile-depth-measurement functionality in a state arranged on the laser distance measuring device 100.

Using the various attachment devices 200 (in particular here 200a-200m), a wide range of additional functionality can be provided for the laser distance measuring device 100, which would not be available without the corresponding attachment devices 200.

In particular, attachment devices 200 can be used with electrical additional functions, for example with sensors (not shown here in more detail), motors, diodes or the like, wherein the energy supply of the corresponding attachment devices 200 is favorably provided using the energy supply device of the laser distance measuring device 100.

FIG. 2 shows an exemplary attachment device 200a in a perspective illustration, which device provides a distance-measurement functionality. For this purpose, the attachment device 200a has a wheel 208 mounted in the attachment housing 202a (here as an attachment housing 202a made of two half-shells 206a, 206b) for position determination. This wheel 208 detects a movement of the attachment device 200a based on a surface (not shown in more detail), over which the attachment device 200a is moved or rolled by means of the wheel 208. Thereby, the length of the distance section covered by the attachment device 200a can be electronically detected using a sensor 210, which detects a rotation of the wheel 208. For this purpose, the wheel 208 is swivel-mounted via a wheel axis 212 in a receptacle 214 of the sensor 210. The sensor 210 comprises its own control unit 216, which—apart from an energy supply device—includes all the means necessary to operate the sensor 210. A measurement signal emitted by the sensor 210, in particular by the control unit 216, therefore comprises data information that characterizes a distance traveled when the wheel 208 is in motion. In a state arranged on the laser distance measuring device 100, this data information can be output to the laser distance measuring device 100, wherein the data information can be further processed by the control device of the laser distance measuring device 100. In particular, the data information, for example a distance-measurement value, can be output to an operator of the laser distance measuring device 100 using the output device 104. In such a way, the laser distance measuring device 100 can be used, using the attachment device 200a, for the simple determination of lengths of undefined distances on surfaces, which are not necessarily connectible by means of a straight line (curved surface or the like).

FIG. 3 shows a further exemplary attachment device 200b which provides a measuring-tape functionality. For this purpose, the attachment device 200b comprises a tape 218 that can be pulled out of the attachment housing 202b. This tape 218 can be favorably mounted and guided on a self-resetting roller 220 in the attachment housing 202b. The attachment housing 202b is sealed herein by a housing cover 222. A retaining plate 224 is attached to the tape 218, which can be pulled out of the attachment housing 202b, by means of which the tape 218 can be conveniently grabbed and pulled out by an operator of the laser distance measuring device 100. The length of the tape 218 pulled out of the attachment housing 202b can be electronically detected using a sensor (not shown in more detail). Thereby, the sensor also comprises its own control unit (not shown in more detail), which—apart from an energy supply device—includes all the means necessary to operate the sensor. A measurement signal emitted by the sensor, in particular by the control unit of the sensor, thus comprises data information that characterizes a length of the pulled-out measuring tape. In a state arranged on the laser distance measuring device 100, this data information can be output to the laser distance measuring device 100, wherein the data information can be further processed by the control device of the laser distance measuring device 100. In particular, the data information, for example a length measurement value, can be output to an operator of the laser distance measuring device 100 using the output device 104. In such a way, the laser distance measuring device 100 can be used, using the attachment device 200b, for the simple determination of lengths of undefined distances on surfaces, which are not necessarily connectible by means of a straight line (curved surface or the like).

FIG. 4 shows a further exemplary attachment device 200c which provides a level functionality. For this purpose, the attachment device 200c comprises an attachment housing 202c, in which two levels 226 (water scales) are held.

Furthermore, the attachment housing 202c comprises a cylinder lens 228, which is intended to fan out a laser beam 108 emitted by the laser distance measuring device 100 into a laser fan and to convert it into a laser line that can be projected onto a remote object. In the attachment housing 202c, the cylinder lens 228 is also held by two bars 230, which protrude from a cover 232 of the attachment housing 202c, in a stationary manner in the beam profile of the laser beam 108, which is capable of being emitted and which hits the cylinder lens 228 through an opening 234 of the attachment housing 202c, in particular of the cover 232 of the attachment housing 202c. In such a way, the laser distance measuring device 100 can initially be favorably oriented using the levels 226 and then or simultaneously a laser beam 108 emitted by the laser distance measuring device 100 can be fanned out by the cylinder lens 228 and be projected onto a remote object for generating a laser line. Accordingly, this exemplary embodiment does not comprise any further sensors and also does not require a control unit or any energy supply. Furthermore, in addition, no data information is output to the laser distance measuring device 100.

The control device of the handheld laser distance measuring device 100 is set up to detect an arranged state of an attachment device 200 and a type (in accordance with FIG.

1 according to the indexes a-m) of an arranged attachment device 200. The detection of the arranged state of an attachment device 200 as well as of a type of an arranged attachment device 200 takes place in the exemplary embodiment shown using an electrical identifier (not shown in more detail) in the form of a coding resistor integrated in each attachment device 200. For this purpose, the laser distance measuring device 100 comprises a readout circuit (not shown here in more detail), by means of which the respective resistance value of the coding resistance can be read out. The resistance value is thereby used as a clear indicator for a type of a respectively arranged attachment device 200*a-m*. The readout circuit generates a signal via the detection of the arranged state and of the type of the arranged attachment device 200, which is passed on to the control device of the laser distance measuring device 100 and is further processed by this. Depending on the detection of an arranged attachment device 200 and/or depending on the capture of a type of an arranged attachment device 200, the control device can perform a function and change an operating state.

For example, the control device is provided to prevent the emission of laser radiation 108 in the case of arranging an attachment device 200*b*, which provides a measuring-tape functionality. Furthermore, the control device is provided to control or regulate, in particular, to activate or deactivate an energy supply of a device-side electrical coupling device (cf. FIG. 5 in particular), in particular, an energy supply of the attachment device 200 arranged on the laser distance measuring device 100.

Furthermore, the control device is intended to further process a measurement signal output by the sensor, in particular, by the control unit of the sensor, of the attachment device 200, in particular, data information and output it using the output device 104. In the case of the attachment device 200*b*, for example, this data information can represent a length measurement value. In this sense, the control device is intended to provide a specific functionality for each specific attachment device 200*a-m*, in particular, regulation and/or control routines.

As is shown in the following figures based on the exemplary embodiments, according to the invention, each of the attachment devices 200 comprises an attachment-side coupling device 400 paired with the respective attachment housing 202, said coupling device 400 being set up for the reversible arrangement of the attachment device 200 on the laser distance measuring device 100. As is also shown in the following figures, accordingly, the laser distance measuring device 100 comprises a device-side coupling device 300 paired with the device housing 102, which is set up for the reversible arrangement of each attachment device 200 of the system 10 on the laser distance measuring device 100. The device-side coupling device 300 of the laser distance measuring device 100 and the attachment-side coupling device 400 of the attachment device 200 are designed in such a corresponding or complementary way, that they can they favorably interact for the reversible arrangement of the attachment device 200 on the laser distance measuring device 100. The (device-side and attachment-side) coupling devices 300, 400 ensure a tool-free detachable connection of the attachment device 200 on the laser distance measuring device 100. The coupling devices 300, 400 also allow a simple arrangement or a simple exchange of different attachment devices 200, which can be selected according to the need and situation by an operator of the system 10, on the laser distance measuring device 100.

It should be noted that, in the following FIGS. 5 to 10, only the coupling devices 300, 400, in particular, their coupling interfaces 302, 402, are discussed respectively. The coupling interfaces 302, 402 serve the mechanical connection of the attachment device 200 connected to the coupling interface, which is however not further executed in FIGS. 5 to 10 (graphic is also not further elaborated).

In the exemplary embodiment shown in FIG. 5, the device-side coupling device 300*a* is divided into a device-side coupling interface 302*a* to a mechanical connection of the attachment device 200 on the device housing 102 of the laser distance measuring device 100, a device-side energy interface 304*a* to an energy connection of the attachment device 200 to the laser distance measuring device 100, in particular, to the control device and to the energy supply device of the laser distance measuring device 100, and a device-side data communication interface (not shown in more detail) to an information-transmitting connection of the attachment device 200 to the laser distance measuring device 100, in particular, to the control device and to the output device 104 of the laser distance measuring device 100. Correspondingly, the attachment-side coupling device 400*a* is also divided into an attachment-side coupling interface 402*a* for a mechanical connection of the attachment device 200 on the device housing 102 of the laser distance measuring device 100 and an attachment-side energy interface 404*a* for an energy connection of the attachment device 200 to the laser distance measuring device 100, in particular, to the control device and to the energy supply device of the laser distance measuring device 100 and an attachment-side data communication interface (not shown here in more detail) for an information-transmitting connection of the attachment device 200 to the laser distance measuring device 100, in particular, to the control device and to the output device 104 of the laser distance measuring device 100.

The energy interface 304*a*, 404*a* is implemented in the form of an electrical interface 306*a*, 406*a*, which is designed to electrically connect the attachment device 200 to the laser distance measuring device 100, in particular, to its energy supply device. The device-side energy interface 304*a* comprises two contact elements 308*a*. The attachment-side energy interface 404*a* also has two contact elements 408*a*. The contact elements 308*a*, 408*a* are implemented in each case in the form of contact surfaces, which, in the case of proper arrangement of the attachment device 200, touch each other on the laser distance measuring device 100 and thus establish an electrical contact. In this way, the energy supply device of the laser distance measuring device 100 can simultaneously be used to supply energy to the attachment device 200. The energy interface 304*a*, 404*a* is set up for an energy connection of the attachment device 200 to the device housing 102 of the laser distance measuring device 100 coupled with the mechanical connection.

The data communication interface (not shown here in more detail, since wireless) is used as the information-transmitting connection of the attachment device 200 to the laser distance measuring device 100, in particular, to the control device of the laser distance measuring device 100. In the exemplary embodiments shown in FIGS. 5 to 10, the data communication interface is respectively designed as a wireless data communication interface, by means of which the attachment device 200 can send measurement results to the laser distance measuring device 100. The data communication interface uses a standardized communication protocol, here, a Bluetooth or NFC protocol, to transmit data information. In particular, the device-side data communication interface automatically connects to the attachment-side data communication interface as soon as a distance of the attachment device 200 to the laser distance measuring device 100 falls below a value of 50 cm, preferably falling below a value of 10 cm. By means of the data communication interface, measured data information, for example, distances, temperature, moisture-measurement values or other provided data information dependent on the respectively used attachment device 200 are transmitted to the laser distance measuring device 100, in particular to its control device. The data information received from the control device is further processed if necessary, in particular, by data processing, data output, data storage or the like.

The attachment-side coupling device 400a shown in FIG. 5 comprises a coupling element 410a as a coupling interface 402a, which is set up to implement a non-positive-locking coupling with the device-side coupling interface 302a of the laser distance measuring device 100. The coupling element 410a is implemented as a projection 412 protruding over the attachment housing 202, in which a magnet is accommodated (not shown here in more detail). The coupling element 410a protrudes over the attachment housing by 5 mm and comprises a cuboid shape with edge lengths of approx. mm, approx. 7 mm and 5 mm. The device-side coupling interface 302a correspondingly comprises a cuboid depression 310a, wherein the dimensions of the depression 310a are slightly larger than those of the coupling element 410a so that the coupling element 410a disappears in the depression 310a in the arranged state of the attachment device 200 on the laser distance measuring device 100. Behind the depression 310a, inside the device housing 102, a magnet is also concealed, which exerts an attracting effect onto the magnet of the coupling element 410a. The magnets cause a non-positive-locking coupling of the coupling interfaces 302a, 402a. In this exemplary embodiment of the coupling device 300a, 400a, no mechanically movable components are present so that a particularly compact and durable coupling device 300a, 400a can be realized. Furthermore, the coupling device 300a, 400a, in particular the attachment-side coupling interface 402a with the coupling element 410a, simultaneously implements an axial lock, a radial lock as well as a spin-lock of the attachment device 200 with reference to the laser distance measuring device 100 for the non-positive-locking connection of the attachment device 200 to the laser distance measuring device 100.

In FIG. 6, an alternative embodiment of an attachment-side coupling interface 402b is shown, which comprises a coupling element 410b, which is set up to implement a non-positive-locking and positive-locking coupling with the device-side coupling interface 302b of the laser distance measuring device 100. The attachment-side coupling interface 402b is set up to form an undercut when arranging the attachment device 200 with the device-side coupling interface 302b, in particular, a detent connection. Here, the attachment-side coupling interface 402b of the attachment device 200 is implemented as a positive-locking and non-positive-locking connection element 414b of a detent connection in the form of two spring-loaded elements, i.e. spring detents, arranged on the opposite sides of the attachment housing 202, thereby forming elastic detent hooks 416b. Accordingly, the device-side coupling interface 302b is also implemented as a correspondingly formed positive-locking and non-positive-locking connection element 314b of the detent connection in the form of two recesses 316b. The detent hooks 416b engage into the correspondingly and complementarily formed recesses 316b respectively in a detent manner when setting on the attachment device 200 onto the device housing 102 of the laser distance measuring device 100. Favorably, the detent connection between the attachment device 200 and the device housing 102 of the laser distance measuring device 100 is automatically effective, i.e. without any other manipulation or influence of any other aid ("autolock function"). The coupling interface 302b, 402b simultaneously furthermore implements an axial lock, a radial lock as well as a spin-lock of the attachment device 200 with reference to the laser distance measuring device 100 for the positive-locking and the non-positive-locking connection of the attachment device 200 on the laser distance measuring device 100. To detach the detent connection, the two spring-mounted detent hooks 416b are actuated by hand against the spring force to disengage the positive-locking and non-positive-locking connection elements 414b with the corresponding recesses 316b on the device housing 102. For this purpose, the two positive-locking and non-positive-locking connection elements 414b in the form of the detent hooks 416b each comprise an unlocking button 418b as an unlocking element, formed as a flat pushbutton, by means of which the operator of the laser distance measuring device 100 can trigger an unlocking.

A schematic representation, as the attachment device 200, in particular the attachment-side coupling interface 402b, at the arrangement and/or at the release is guided and held by a hand of an operator, is shown in FIG. 7.

FIGS. 8a and 8b each show a section of two different embodiments of an attachment-side coupling interface 402c and 402d respectively in a perspective view. The embodiments represent variations of the embodiment shown in FIG. 6 of the attachment-side coupling interface 402b.

In FIG. 8a, the attachment-side coupling interface 402c forming component 420c is designed as a three-part component 420c. Two side parts 422c each comprise an detent hook 416c, which is connected to an unlocking element in the form of an unlocking button 418c. A connection piece 424c is arranged between the two side parts 422c. The connection piece 424c has a substantially U-shaped shape with two limbs 430c, wherein the opening of this U-shape extends in the direction of the attachment device 200 and away from the coupling interface 402c. The U-shaped connection piece 424c furthermore forms an approx. 1 cm high, approx. 1 mm thick wall 426c, which extends along the U-shape. The wall 426c has a recess 428c, which is used as the passage (or inlet into the attachment housing 202) for laser radiation 108, provided that the attachment device 200 is arranged on the laser distance measuring device 100 and emits this laser radiation 108. The limbs 430c of the U-shaped connection piece 424c each comprise an abutment 432 at their ends for the movable support and guidance of the side parts 422c put onto it in a connectionless manner. In this case, the side parts 422c each run along a limb 430c of the U-shaped connection piece 424c, in particular, running in parallel. The three-part component 420c is accommodated in an interface housing 434c of the attachment-side coupling interface 402c, wherein the interface housing 434c respectively comprises a recess 436c in its surface on two opposite sides for accommodating the unlocking buttons 418c, wherein the unlocking buttons 418c along with the respective surface of the interface housing 434c form an essentially level (planar) arrangement.

In FIG. 8b, the component 420d forming the attachment-side coupling interface 402d is designed as a single-part component 420d, particularly being designed as a single piece. Two side parts 422d of the component 420d each comprise a detent hook 416d, which is connected to an unlocking element in the form of an unlocking button 418d. A connection piece 424d is arranged between the two side parts 422d. The shape of the connection piece 424d essentially corresponds to the shape of the connection piece 424c from FIG. 8a. However, the limbs 430d of the U-shaped connection piece 424d do not form an abutment but are each connected via a U-shaped connection 438 directly to one end of a side part 422d to be set on as a single piece. In this case, the side parts 422d each run along a limb 430d of the U-shaped connection piece 424d, in particular, running in parallel. The single-part component 420d is accommodated in an interface housing 434d of the attachment-side coupling interface 402d, wherein the interface housing 434d also respectively comprise a recess 436d on two opposite sides in its surface for accommodating the unlocking buttons 418d, wherein the unlocking buttons 418d along with the respective surface of the interface housing 434d form an essentially level (planar) arrangement.

FIG. 8c shows another section of the attachment-side coupling interface 402d shown in FIG. 8b, in particular an attachment device 200 arranged on a laser distance measuring device 100, in particular, arranged on the device-side coupling interface 302d using the attachment-side coupling interface 402d. In particular, it is apparent that the spring-loaded positive-locking and non-positive-locking connection element 414d, in particular the detent hook 416d, is designed as a detent hook 416d spring-mounted by means of a leaf spring 440. The detent hook 416d comprises a guide bevel 442 on its tip, wherein the guide bevel 442 of the detent hook 416d interacts with a corresponding guide bevel 342 on the device-side coupling interface 302d in such a way that the spring-loaded detent hook 416d is already tensioned without further ado when setting the attachment device 200 on the device housing 102d and snaps into or engages into the recess 316d. Thereby, the detent hook 416d as well as an element 344 slightly protruding over the recess 316d of the device-side coupling interface 302d form an undercut 346d.

Furthermore, in FIG. 8c, it is evident how the recess 436d permeable to the laser radiation 108 in the connection piece 424d of the attachment-side coupling interface 402d coincides with the transmitting optics 110, in particular, an opening in the device housing 102 of the laser distance measuring device 100 in such a way that laser radiation 108 emitted by the laser distance measuring device 100 can enter into the attachment housing 102 through the recess 436d. Furthermore, it can be seen in FIG. 8c that the attachment-side coupling interface 402d comprises a guide 444d, in particular, a slightly beveled guide 444d, which ensures a play-free and precisely aligned arrangement of the attachment device 200 on the laser distance measuring device 100.

FIG. 8d shows another section of the attachment-side coupling interface 402d shown in FIG. 8b, in particular an attachment device 200 arranged on a laser distance measuring device 100, in particular, the device-side coupling interface 302d using the attachment-side coupling interface 402d. The section in this view is orthogonal to the section shown in FIG. 8c. In particular, it is evident how the recess 436d permeable to the laser radiation 108 in the connection piece 424d of the attachment-side coupling interface 402d coincides with the transmitting optics 110, in particular, an opening in the device housing 102 of the laser distance measuring device 100 in such a way that laser radiation 108 emitted by the laser distance measuring device 100 can enter into the attachment housing 102 through the recess 436d. Furthermore, it can be seen in FIG. 8d that the attachment-side coupling interface 402d comprises other guiding elements, in particular, slightly beveled guides 444d, which ensures a play-free and precisely aligned arrangement of the attachment device 200 on the laser distance measuring device 100.

FIG. 8e shows a slightly modified embodiment of the attachment-side coupling interface 402d shown in FIG. 8b in a schematic manner. While the attachment-side coupling interface 402d shown in FIG. 8b respectively comprises two detent hooks 416d along with unlocking elements in the form of unlocking buttons 418d on two opposite sides of the attachment housing 202, the embodiment schematically shown in FIG. 8e is implemented using only one detent hook 416e along with an unlocking element in the form of an unlocking button 418e. Only one small hook 446e is located on the second side of the attachment housing 202 lying opposite to the detent hook 416e as a counter bearing so that the attachment housing 202 initially hooks in on one side when being placed onto the device housing 102 and then, without further ado, it is tensioned by means of the spring-loaded detent hook 416e and snaps in or engages into a device-side recess 316e. Both the single-side detent hook 416e as well as the small hook 446e each form an undercut 346e with a device-side recess 316e.

FIG. 9 shows a slightly modified attachment-side coupling interface 402f and a correspondingly slightly modified device-side coupling interface 302f compared to the embodiments shown in FIGS. 8a to 8e. Here, the connection piece 424f of the attachment-side coupling interface 402f (see explanations for FIGS. 8a and 8b) comprises an anti-rotation protection 448f in the form of a substantially U-shaped profile protruding from the paper plane located within the paper plane. Accordingly, the device-side coupling device 302f comprises a depression 348f or a recess in the paper plane sinking out of the paper plane essentially in the form of a U-shape. This anti-rotation protection 448f makes the arrangement of the attachment device 200 on the laser distance measuring device 100 possible in only one preferred direction, in which the protruding profile of the anti-rotation protection 448f of the attachment-side coupling interface 402f and the depression 348f of the device-side coupling interface 302f lie congruently with one another and thereby, the protruding profile is accommodated in the depression 348f. This is how this particular shaping of the coupling interface 302f, 402f allows for ruling out rotational positions of the attachment device 200 relative to the laser distance measuring device 100. In particular, the attachment device 200 can only be arranged in a single position or orientation on the laser distance measuring device 100.

It should be noted at this point that the coupling element 410a shown in FIG. 5 also acts as an anti-rotation protection 448a since it allows an arrangement of the attachment device 200 on the laser distance measuring device 100 only in a defined orientation.

FIGS. 10a to 10h show further alternative embodiments of the attachment-side coupling interface 402 and the device-side coupling interface 302.

Figure 10A:
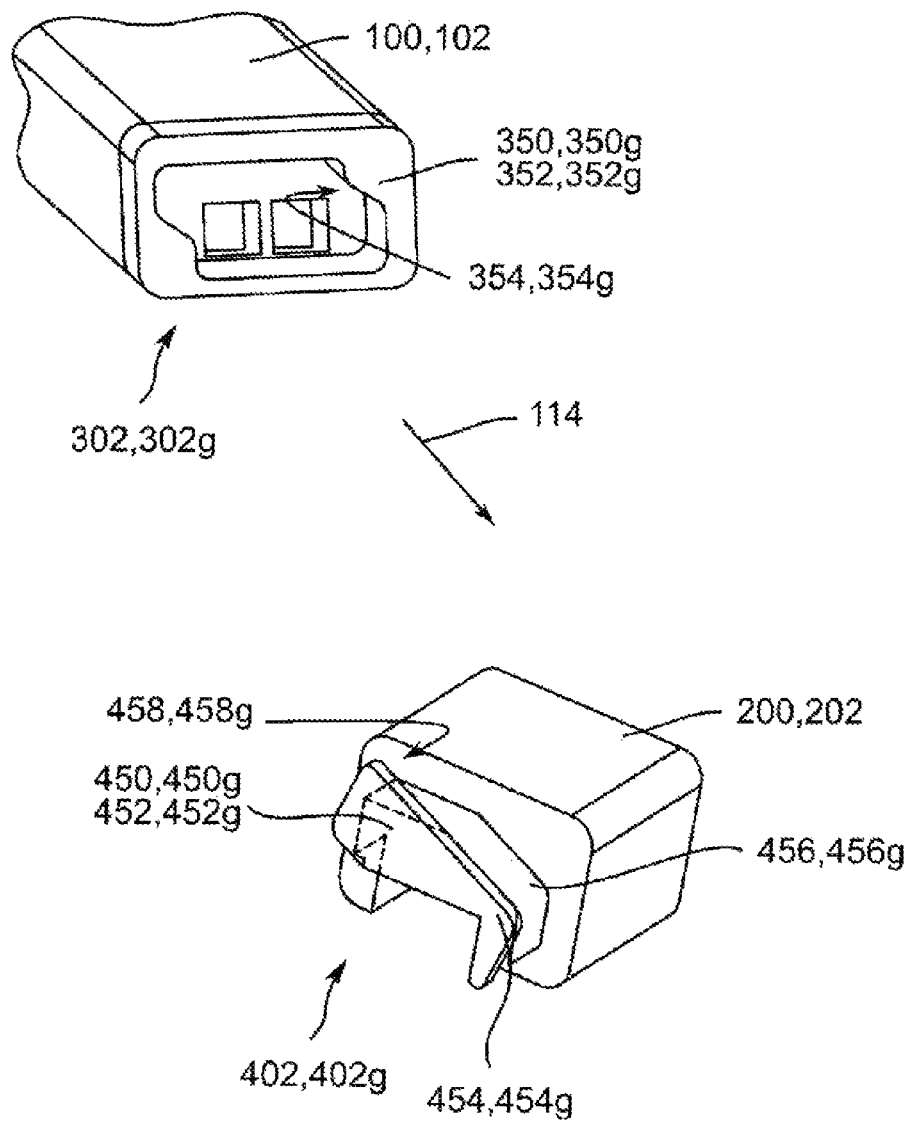
Figure 10B:
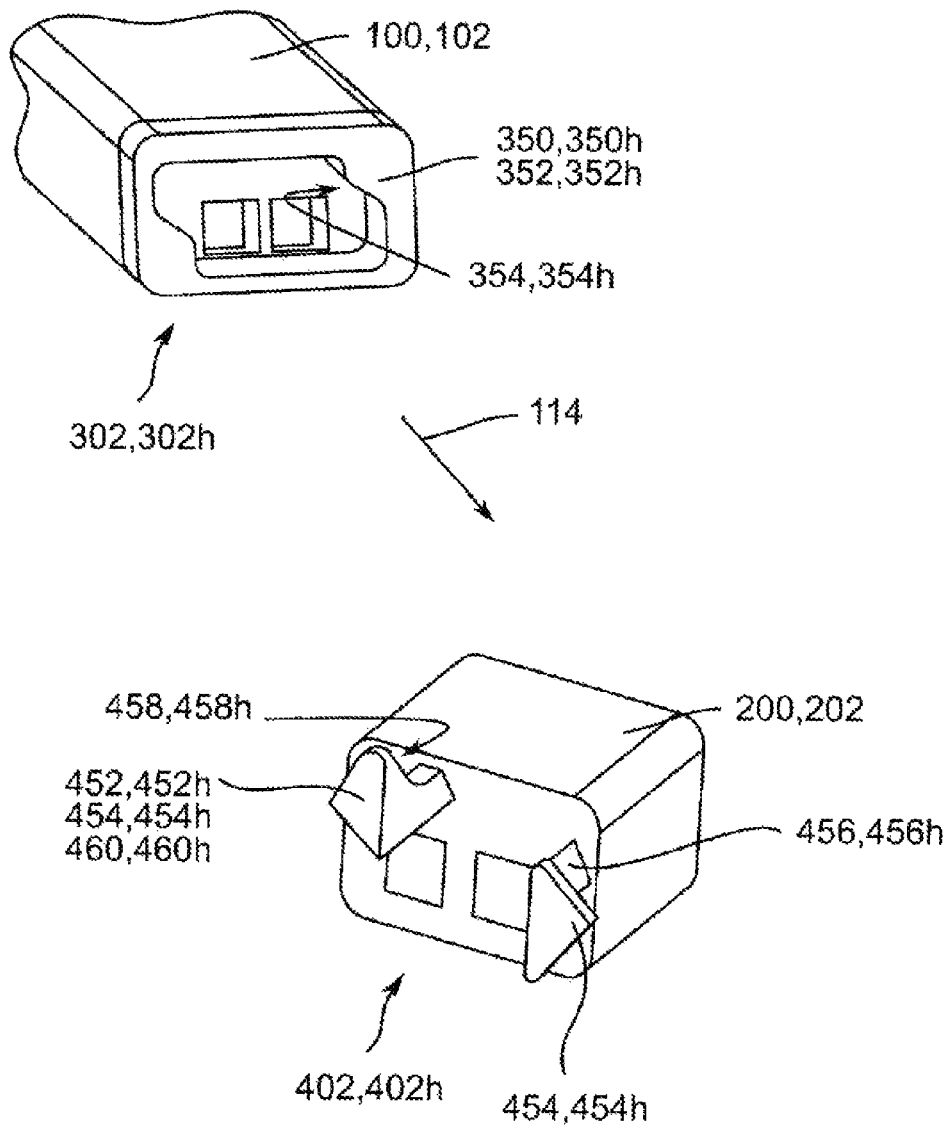
Figure 10C:
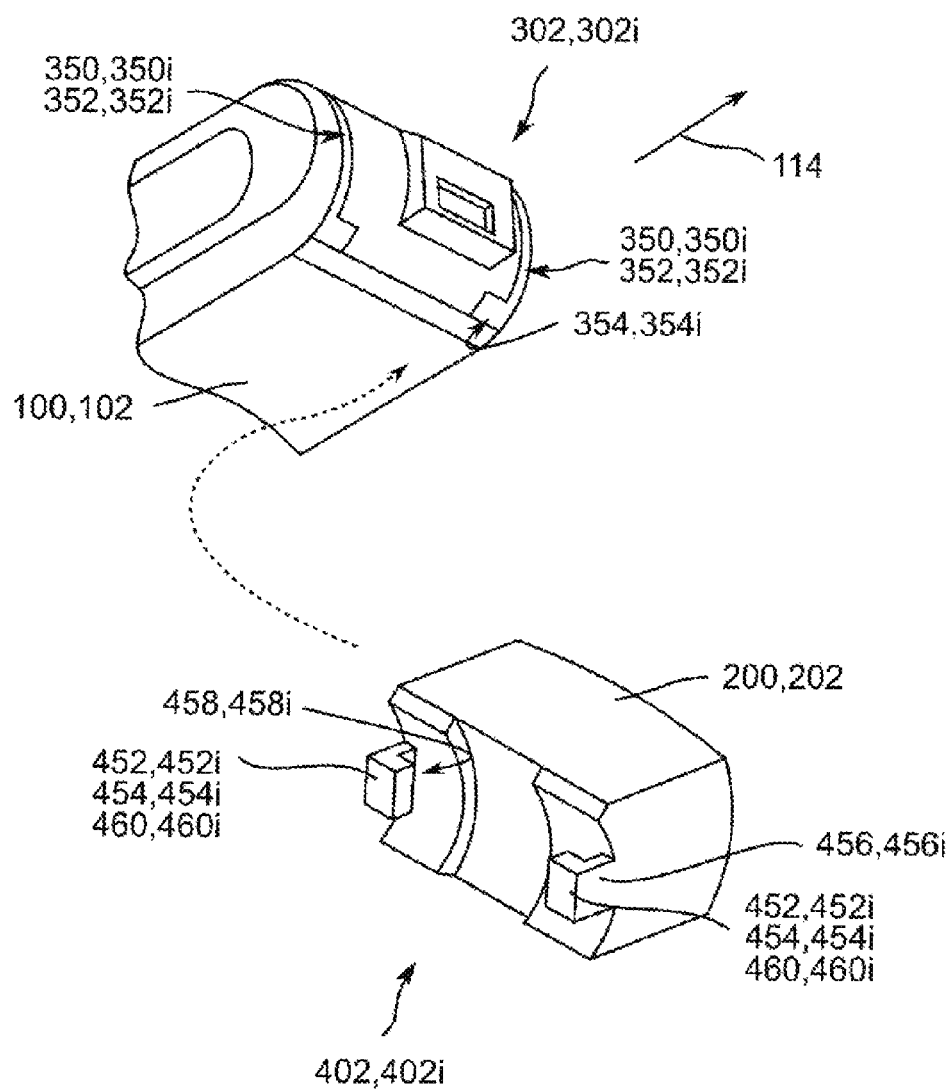

In the embodiments of FIGS. 10a to 10c, the attachment-side coupling interface 402g, 402h, 402i and the device-side coupling interface 302g, 302h, 302i are each implemented as correspondingly designed positive-locking connection elements 452g or 352g of a bayonet connection.

In FIG. 10a, the device-side coupling interface 302g comprises a flange 350g or a flange ring while the attachment-side coupling interface 402g comprises a fastening plate 450g. The flange 302g comprises an undercut 354g, which extends in the circumferential direction of the flange 302g, wherein, in the case of establishing the bayonet connection, at least one corresponding rear-gripping element 454g of the attachment-side coupling interface 402g engages into the undercut 354g like a type of bayonet connection. The arrangement of the attachment device 200 on the laser distance measuring device 100 is carried out by a twisting of the rear-gripping element 354g against the flange 350g so that an undercut of a rear-gripping element 454g and an undercut 354g of the flange 350g is formed. The rear-gripping element 454g of the embodiment in FIG. 10a is implemented in the form of a continuous plate 450g, which is formed on the attachment housing 202 in such a way (here by means of a spacer socket 456g) that an undercut 458g at least partially surrounding the plate 456 results.

In FIG. 10b, the rear-gripping element 454h is not implemented in the form of a continuous plate, but in the form of two individual rear-gripping elements 460h, which are likewise respectively formed on the attachment housing 202 (here by each means of a spacer socket 456h) in such a way that an at least lateral undercut 458h results.

In FIG. 10c, the device-side coupling interface 302i comprises two straight-shaped flanges 350i, while the attachment-side coupling interface 402i has two correspondingly shaped rear-gripping elements 460i. The two straight flanges 350i each have a straight-shaped undercut 354i in the form of two rails, wherein, in the case of establishing the bayonet connection, the two rear-gripping elements 460i of the attachment-side coupling interface 302i are introduced into the straight undercuts 354i like a type of bayonet connection, in particular, into the rails, thereby engaging behind the undercut 354i. The rear-gripping elements 460i of the embodiment in FIG. 10c are formed on the attachment housing 202 (here by each means of a spacer socket 456i) in such a way that an at least lateral undercut 458i results.

Figure 10D:
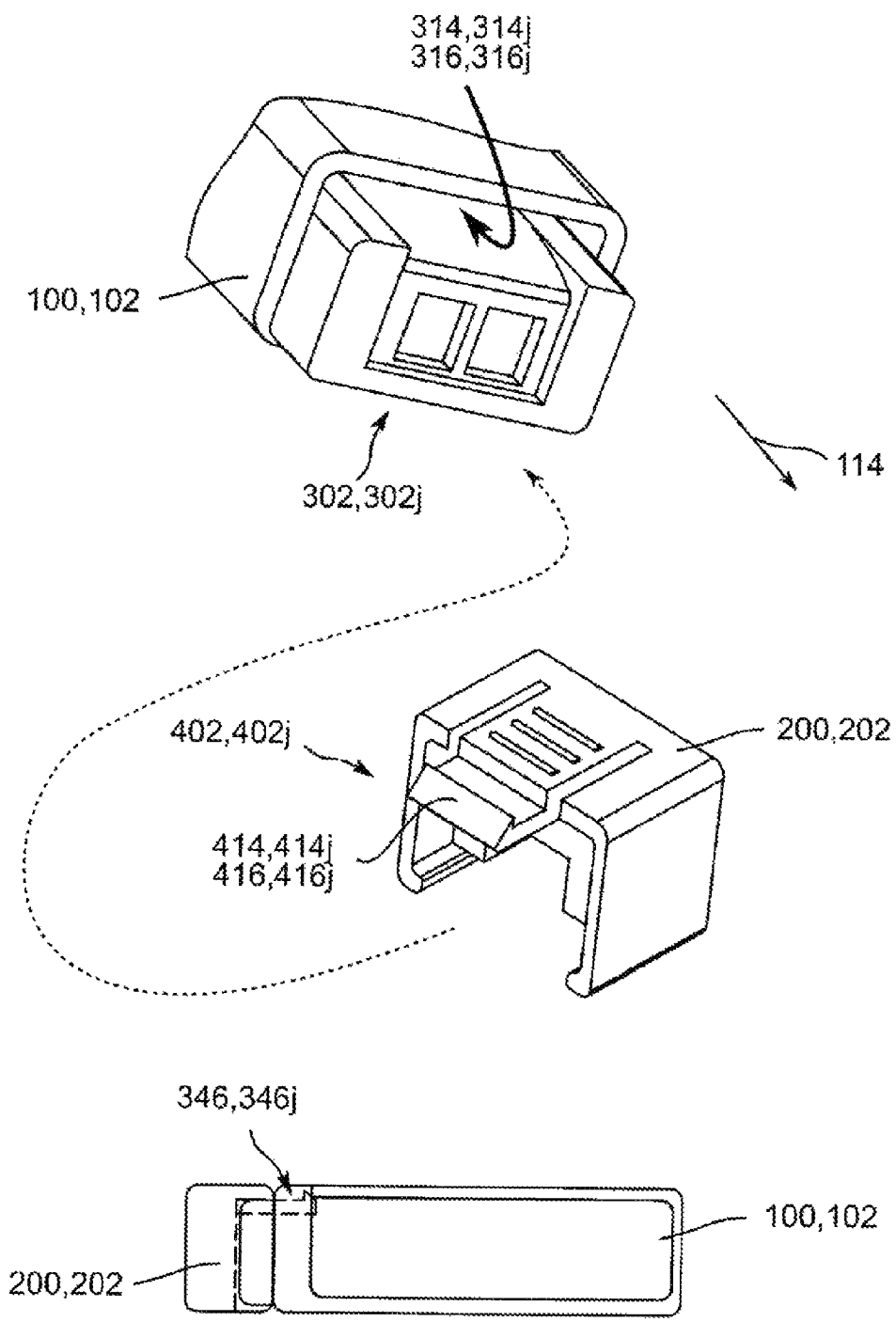

In the embodiment of FIG. 10d, the device-side coupling interface 302j and the attachment-side coupling interface 302j is formed as a correspondingly designed element of a non-positive-locking and positive-locking detent connection. Here, the attachment-side coupling interface 402j is set up to form an undercut 346j in the form of a detent connection when arranging the attachment device 200 with the device-side coupling interface 302j. Here, the attachment-side coupling interface 402j of the attachment device 200 is implemented as a positive-locking and non-positive-locking connection element 414j of a detent connection in the form of a spring-loaded element arranged on the attachment housing 202 on one side, thereby forming an elastic detent hook 416j. Accordingly, the device-side coupling interface 302j is formed as a positive-locking and non-positive-locking connection element 314j corresponding to this detent hook 416j; the detent connection is in the form of a recesses 316j. The detent hook 416j engages into the correspondingly formed recesses 316j in a detent manner when setting on the attachment device 200 onto the device housing 102 of the laser distance measuring device 100.

Figure 10E:
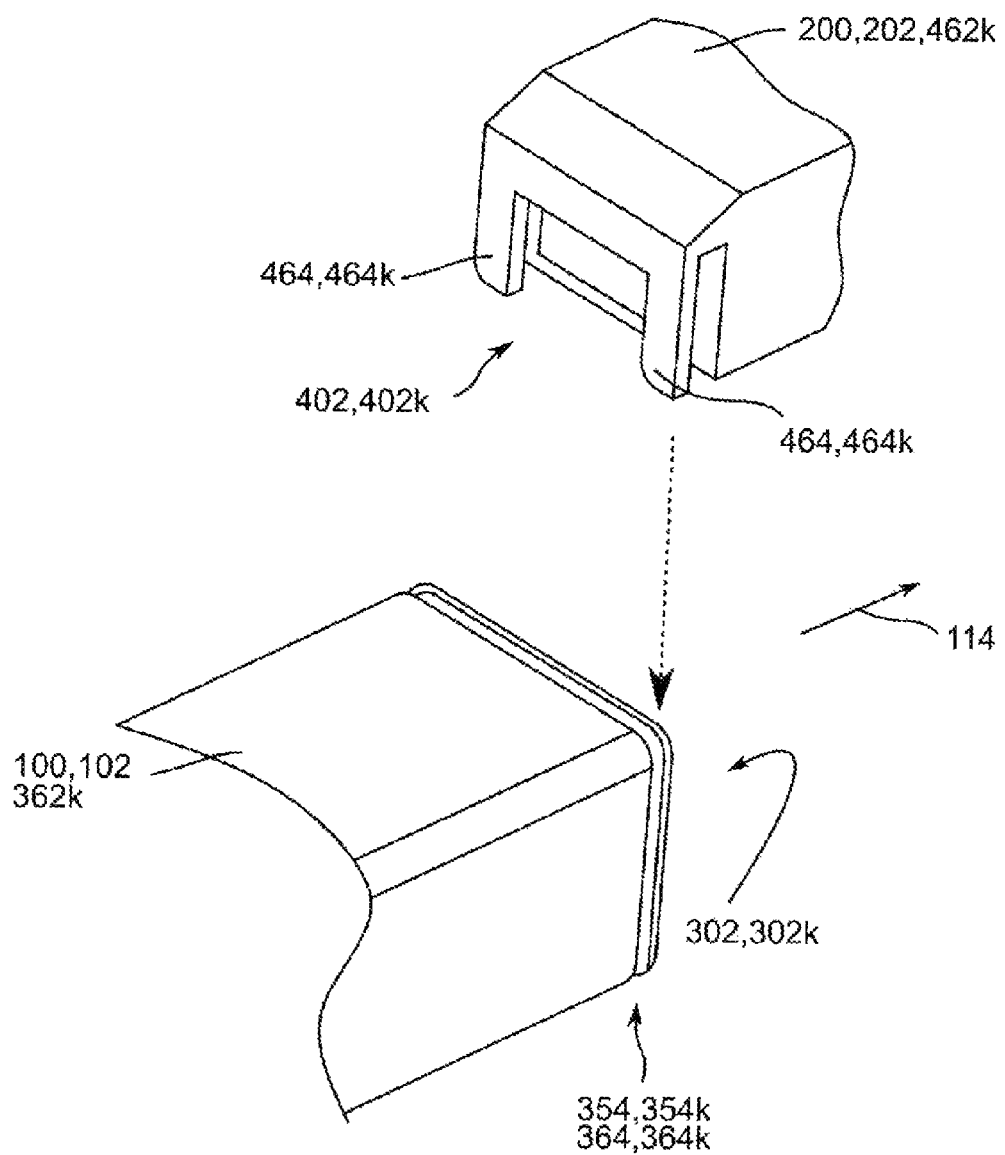
Figure 10F:
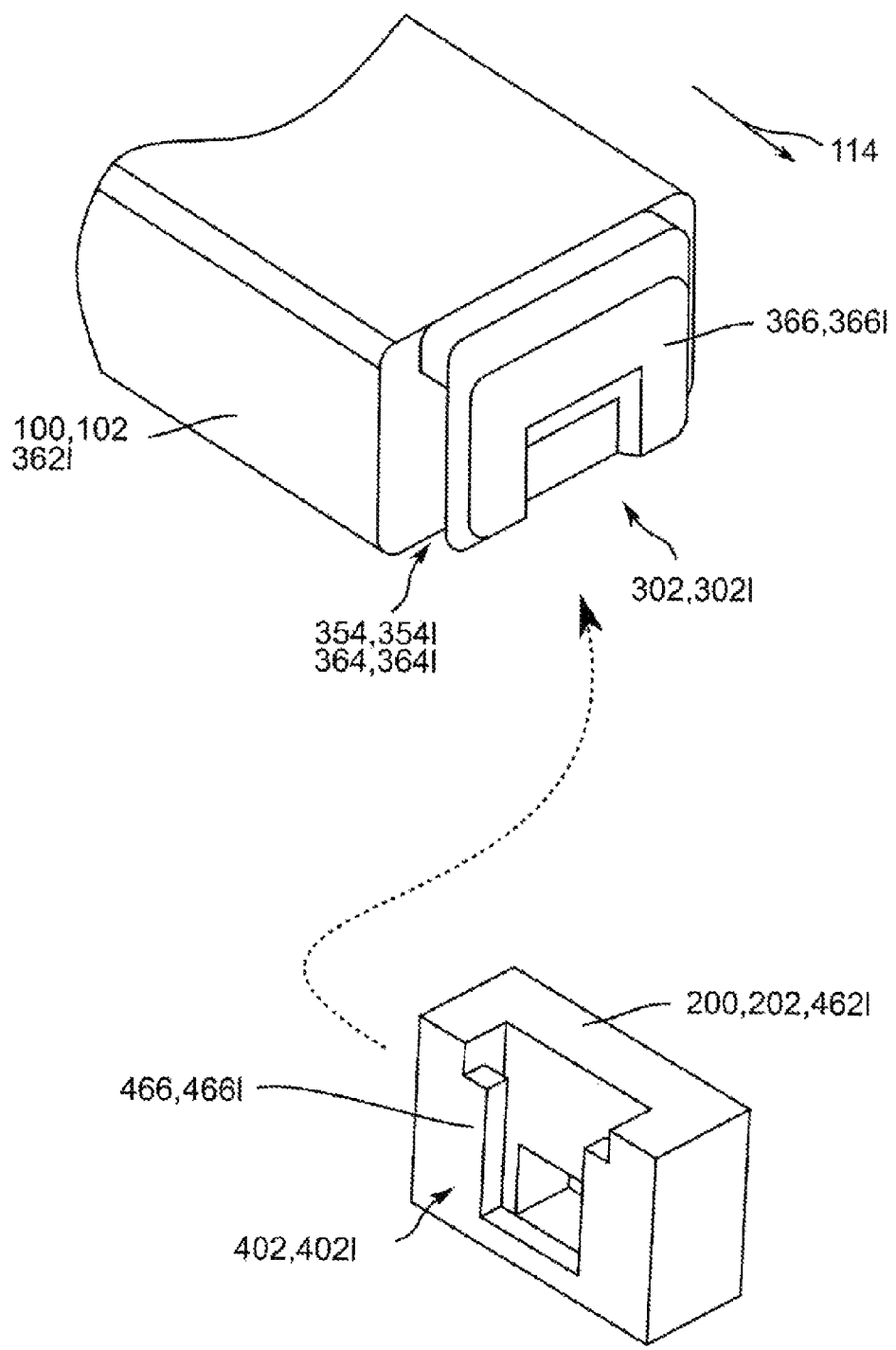
Figure 10G:
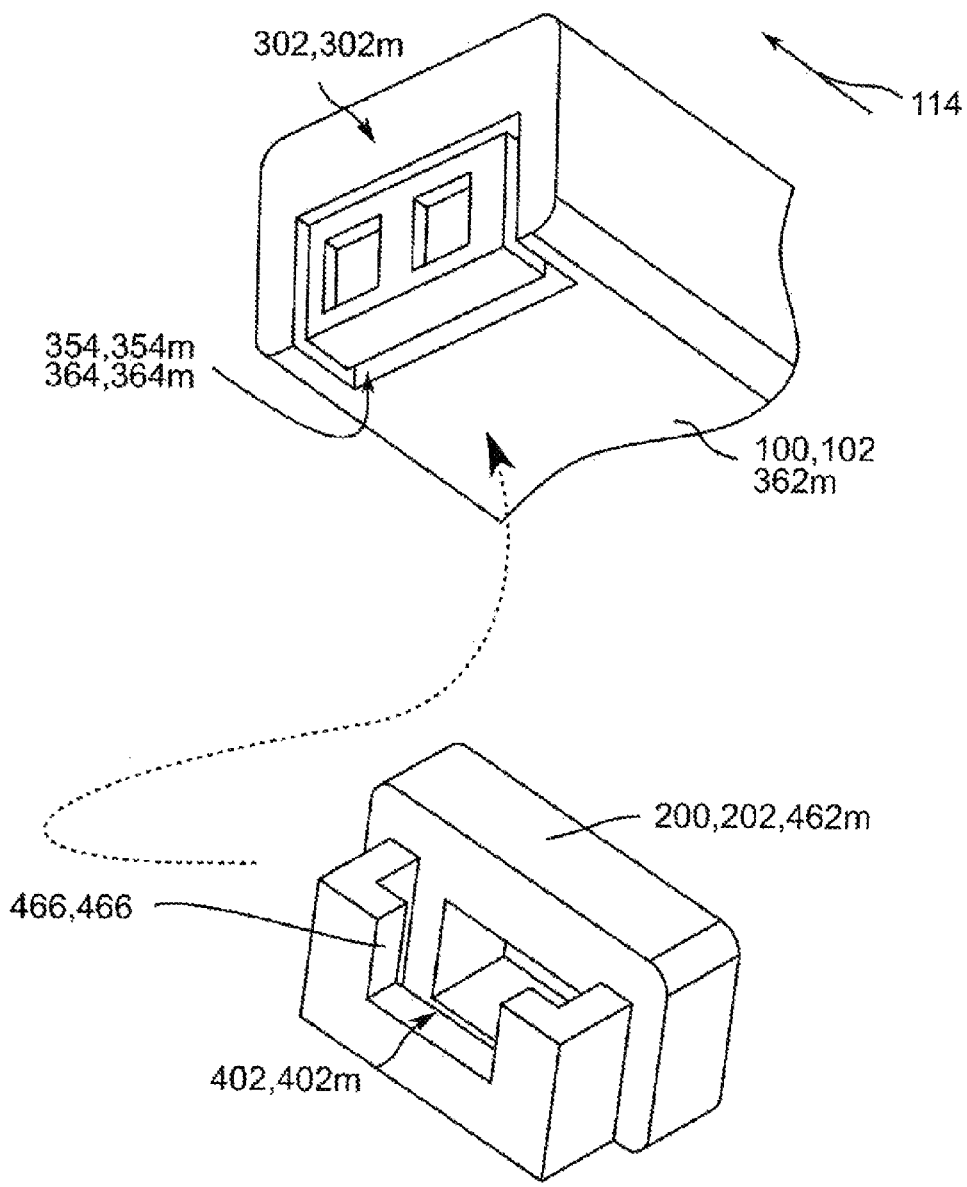

In the embodiments of FIGS. 10e to 10g, the device-side coupling interface 302k, 302l, 302m and the attachment-side coupling interface 402k, 402l, 402m are formed as correspondingly designed elements of an at least positive-locking plug connection. Thereby, the attachment-side coupling interface 402k, 402l, 402m is respectively set up to form an undercut in the form of a plug connection, which ensures a positive-locking connection of the attachment device 200 on the laser distance measuring device 100, when arranging the attachment device 200 with the device-side coupling interface 302k, 302l, 302m. The attachment-side coupling interface 402k, 402l, 402m and the device-side coupling interface 302k, 302l, 302m represent plug-in parts 362k, 362l, 362m, 462k, 462l, 462m suitably formed for a positive-locking fit. The positive-locking fit of the plug connection preferably works at least in the distance measurement direction 114. Furthermore, the attachment-side coupling interface 402k, 402l, 402m and the device-side coupling interface 302k, 302l, 302m can for example be fixed in a detachable non-positive-locking manner by spring force and/or additionally secured against unintentional detaching by screwing.

In FIG. 10e, the attachment device 200 can be plugged onto the device housing 102 in the direction perpendicular to the distance measurement direction 114. Two slats 464k of the attachment-side coupling interface 402k spaced away from the attachment housing 202 engage into a guide rail 364k of the device-side coupling interface 302k formed in the device housing 102 of the laser distance measuring device 100 respectively. As is shown in FIG. 10f, the slats 464l can also be alternatively designed with wraps 466l connected to the attachment device 200, which engage into a guide rail 364l of the device-side coupling interface 302l formed in the device housing 102 of the laser distance measuring device 100 and, in particular, grip around these on the side when arranging the attachment device 200. While, in FIG. 10f, the device-side guide rails 364l are provided in a housing block 366l protruding from the device housing 102, in FIG. 10g, the device-side guide rails are implemented as guide rails 364m embedded within the entire contour of the device housing 102.

In the embodiment shown of FIGS. 5 to 10, the device-side coupling interface 302 as well as the attachment-side coupling interface 402, and furthermore, the device housing 102 and the attachment housing 202 are matched with each other in such a way that the attachment device 200 carries on a housing shape of the laser distance measuring device 100, in particular, its outer contour.

The invention claimed is:

1. A handheld laser distance measuring device, comprising:
   a handheld laser distance measuring device housing including a handheld laser distance measuring device coupling component configured to reversibly couple with an attachment device coupling component of at least one attachment device thereby reversibly coupling the handheld laser distance measuring device with the at least one attachment device; and
   an energy supply component,
   wherein the handheld laser distance measuring device is configured to provide
   a first functionality of contactlessly measuring distance between the handheld laser distance measuring device and a remote object using a laser beam emitted by the laser distance measuring device with none of the attachment device coupling components of the at least one attachment device coupled with the handheld laser distance measuring device coupling component, and
   at least one additional functionality with one of the attachment device coupling components of one of the at least one attachment device coupled with the handheld laser distance measuring device coupling component, wherein
   the handheld laser distance measuring device coupling component is configured to transmit electrical energy to an electrical energy utilization unit of the one of the at least one attachment device.

2. The handheld laser distance measuring device as claimed in claim 1, wherein the handheld laser distance measuring device coupling component is configured to transmit information to the one of the at least one attachment device.

3. The handheld laser distance measuring device as claimed in claim 1, further comprising:

a control device configured to receive and/or to evaluate at least one piece of information transmitted from the one of the at least one attachment device.

4. The handheld laser distance measuring device as claimed in claim 3, wherein the control device is configured to detect a coupled state of the one of the at least one attachment device and/or to detect a type of the one of the at least one attachment device.

5. The handheld laser distance measuring device as claimed in claim 4, further comprising:
an output device,
wherein the control device is configured to output an electrical signal to the output device (i) depending on the detection of the coupled state of the one of the at least one attachment device, and/or the detection of the type of the one of the at least one attachment device, and/or (ii) to control and/or to regulate an energy supply of the handheld laser distance measuring device coupling component.

6. An attachment device, comprising:
an attachment housing including an attachment device coupling component configured to reversibly couple with a handheld laser distance measuring device coupling component of a handheld laser distance measuring device thereby reversibly coupling the attachment device with the handheld laser distance measuring device, the handheld laser distance measuring device configured to provide a first functionality of contactlessly measuring distance between the handheld laser distance measuring device and a remote object using a laser beam emitted by the laser distance measuring device,
wherein with the attachment device coupling component coupled with the handheld laser distance measuring device coupling component, the attachment device provides at least one additional functionality for the handheld laser distance measuring device, and
wherein an electrical energy utilization unit of the attachment device is configured to receive electrical energy transmitted by the handheld laser distance measuring device coupling component.

7. The attachment device as claimed in claim 6, further comprising:
an optical element,
wherein the attachment device is configured to deflect the emitted laser beam of the handheld laser distance measuring device in a state coupled with the handheld laser distance measuring device using the optical element, and
wherein the deflection is at an angle of 90°.

8. The attachment device as claimed in claim 6, further comprising:
a conical mirror,
wherein the attachment device is configured, in a state coupled with the handheld laser distance measuring device, to deflect the emitted laser beam of the handheld laser distance measuring device using the conical mirror, and
wherein the conical mirror projects a laser line on a remote object across an angular range of 360°.

9. The attachment device as claimed in claim 6, further comprising:
at least one cylinder lens,
wherein the attachment device is configured, in a state coupled with the handheld laser distance measuring device, to deflect the emitted laser beam of the handheld laser distance measuring device using the at least one cylinder lens, and
wherein the at least one cylinder lens projects a laser line on a remote object.

10. The attachment device as claimed in claim 6, further comprising:
at least two cylinder lenses,
wherein the attachment device is configured, in a state coupled with the handheld laser distance measuring device, to deflect the emitted laser beam of the handheld laser distance measuring device using the at least two cylinder lenses,
wherein the at least two cylinder lenses project two laser lines on a remote object,
wherein the two laser lines are oriented with respect to one another at an angle of 90°, and
wherein the two laser lines intersect with one another.

11. The attachment device as claimed in claim 6, further comprising:
at least one electrical energy utilization unit configured to be supplied with energy in a state coupled with the handheld laser distance measuring device by an energy supply component of the handheld laser distance measuring device.

12. The attachment device as claimed in claim 6, further comprising:
a light source.

13. The attachment device as claimed in claim 6, wherein the at least one additional functionality is a functionality from a list of functionalities consisting of:
a measuring-tape functionality, a distance-measurement functionality, a temperature-measurement functionality, a moisture-measurement functionality, an air-pressure-measurement functionality, an air-humidity-measurement functionality, an air-temperature-measurement functionality, a carbon-dioxide-measurement functionality, a smoke-detection functionality, a vibration-detection functionality, a motion-detection functionality, a profile-depth-measurement functionality, and a level functionality.

14. The attachment device as claimed in claim 6, further comprising:
a communication interface configured to transmit information to an external data device or to receive information from the external data device.

15. The attachment device as claimed in claim 6, wherein the attachment coupling component is configured to transmit data information to a control device of the handheld laser distance measuring device.

16. A system, comprising:
a handheld laser distance measuring device including (i) a device housing including a device-side coupling component, and (ii) an energy supply component; and
at least one attachment device including an attachment housing including an attachment-side coupling component configured to reversibly couple with the device-side coupling component thereby reversibly coupling the at least one attachment device with the handheld laser distance measuring device,
wherein
the handheld laser distance measuring device is configured to provide a first functionality of contactlessly measuring distance between the handheld laser distance measuring device and a remote object using a laser beam emitted by the laser distance measuring device with none of the attachment-side coupling components of the at least one attachment device coupled with the handheld laser distance measuring device coupling component, the handheld laser distance measuring device is configured to provide at least one additional functionality with one of the at least one attachment device coupled with the handheld laser distance measuring device, and the handheld laser distance measuring device coupling component is configured to transmit electrical energy to an electrical energy utilization unit of the one of the at least one attachment device.

\* \* \* \* \*